United States Patent
Tanaka et al.

(10) Patent No.: US 6,765,175 B2
(45) Date of Patent: Jul. 20, 2004

(54) LASER IRRADIATION APPARATUS, LASER IRRADIATION METHOD, AND MANUFACTURING METHOD FOR A SEMICONDUCTOR DEVICE

(75) Inventors: Koichiro Tanaka, Atsugi (JP); Tomoaki Moriwaka, Atsugi (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

(21) Appl. No.: 10/303,085

(22) Filed: Nov. 25, 2002

(65) Prior Publication Data

US 2003/0141287 A1 Jul. 31, 2003

(30) Foreign Application Priority Data

Nov. 26, 2001 (JP) ........................................ 2001-359395

(51) Int. Cl.$^7$ .............................................. B23K 26/06
(52) U.S. Cl. ................................................ 219/121.73
(58) Field of Search ........................... 219/121.7, 121.67, 219/121.68, 121.69, 121.72, 121.73, 121.74, 121.76, 121.78, 121.79, 121.8; 359/570, 572, 850, 853, 858, 859

(56) References Cited

U.S. PATENT DOCUMENTS

| | | | |
|---|---|---|---|
| 4,378,480 A | * 3/1983 | Langhans | ................ 219/121.7 |
| 4,475,027 A | 10/1984 | Pressley | |
| 4,798,446 A | * 1/1989 | Hettrick | ..................... 359/570 |
| 5,138,490 A | * 8/1992 | Hohberg et al. | ............ 359/570 |
| 5,690,845 A | * 11/1997 | Fuse | ..................... 219/121.74 |
| 5,841,097 A | * 11/1998 | Esaka et al. | ........... 219/121.63 |
| 2001/0005606 A1 | 6/2001 | Tanaka et al. | |

FOREIGN PATENT DOCUMENTS

JP     2001-244213     9/2001

* cited by examiner

*Primary Examiner*—Kiley Stoner
*Assistant Examiner*—Jonathan Johnson
(74) *Attorney, Agent, or Firm*—Eric J. Robinson; Robinson Intellectual Property Law Office, P.C.

(57) ABSTRACT

The laser irradiation apparatus of the present invention is configured to include a laser and at least two mirrors each having a concave surface for unidirectionally homogenizing an energy density of laser light emitted from the laser. A focal position of a first mirror exists between the first mirror and an irradiation surface. A focal position of a second mirror does not exist between the second mirror and the irradiation surface, but exists behind the irradiation surface. The laser irradiation apparatus thus configured enables laser irradiation of, for example, semiconductor films.

14 Claims, 16 Drawing Sheets

FIG. 2A side view
FIG. 2B top view
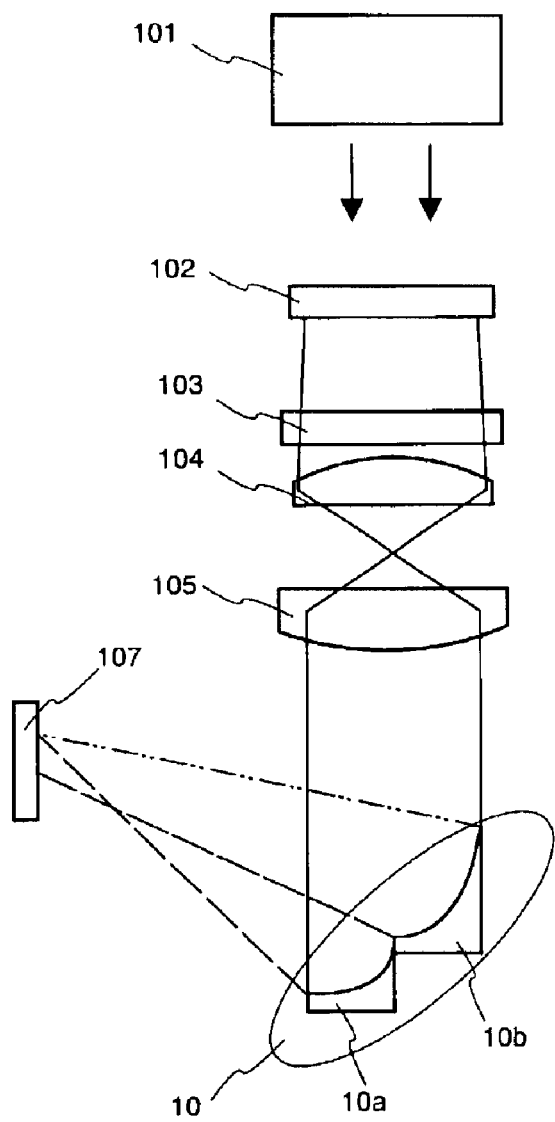
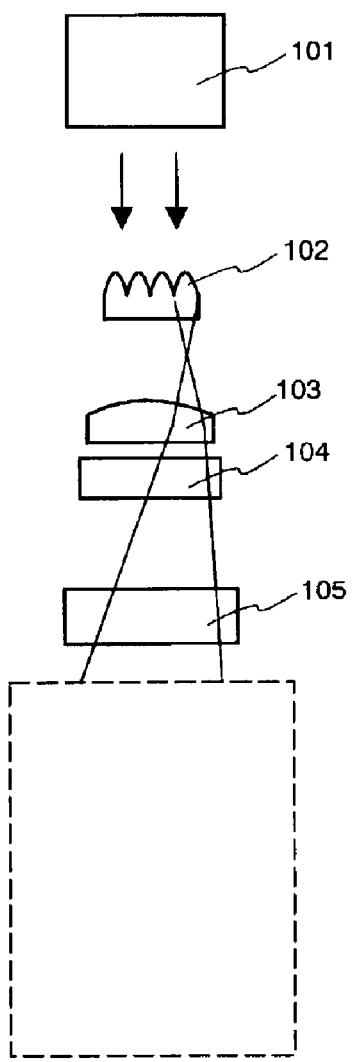

FIG. 6A side view  FIG. 6B top view
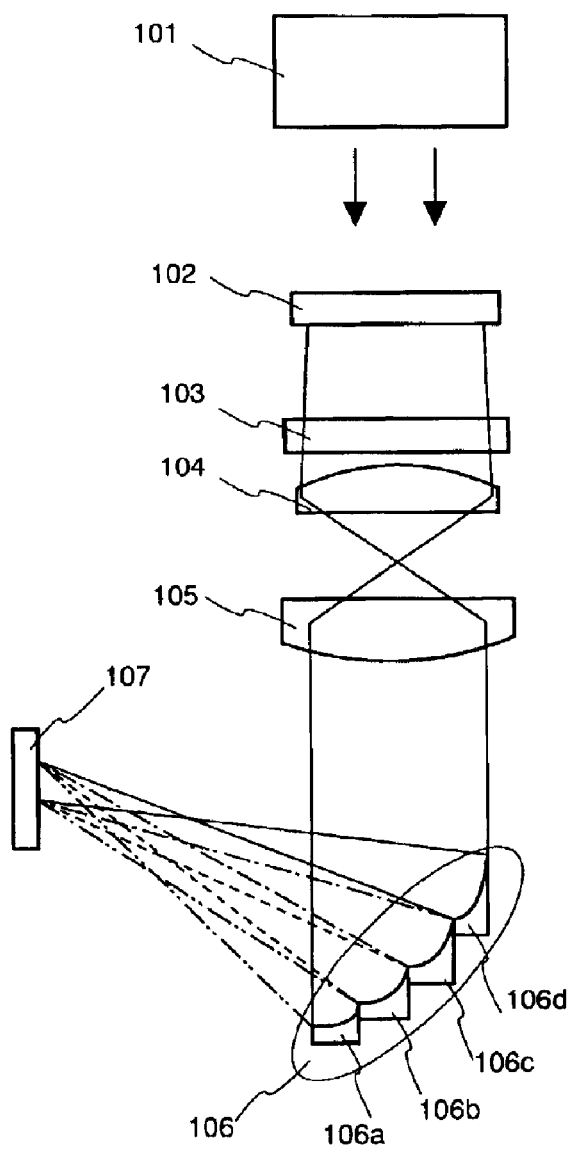
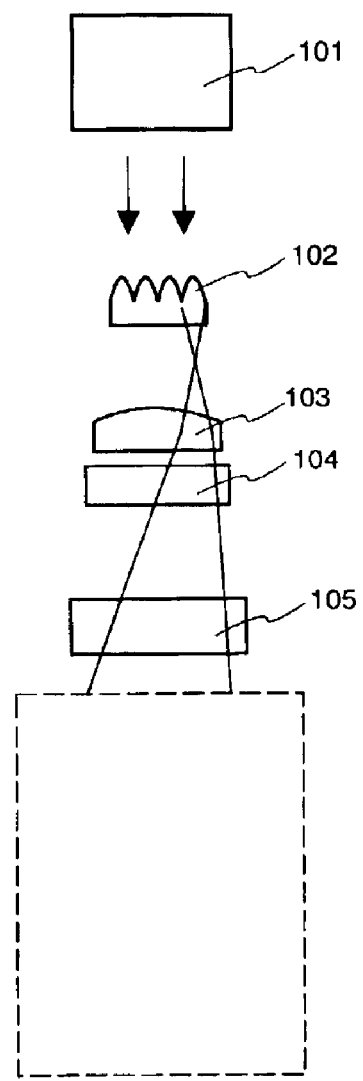

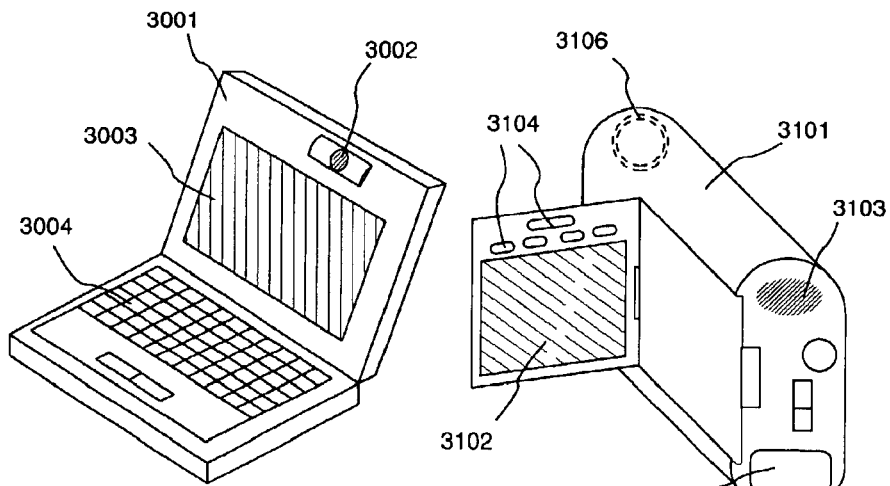
FIG. 14A
FIG. 14B
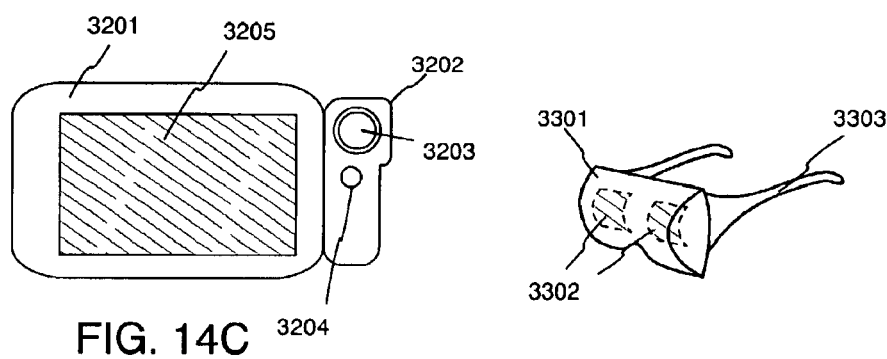
FIG. 14C
FIG. 14D
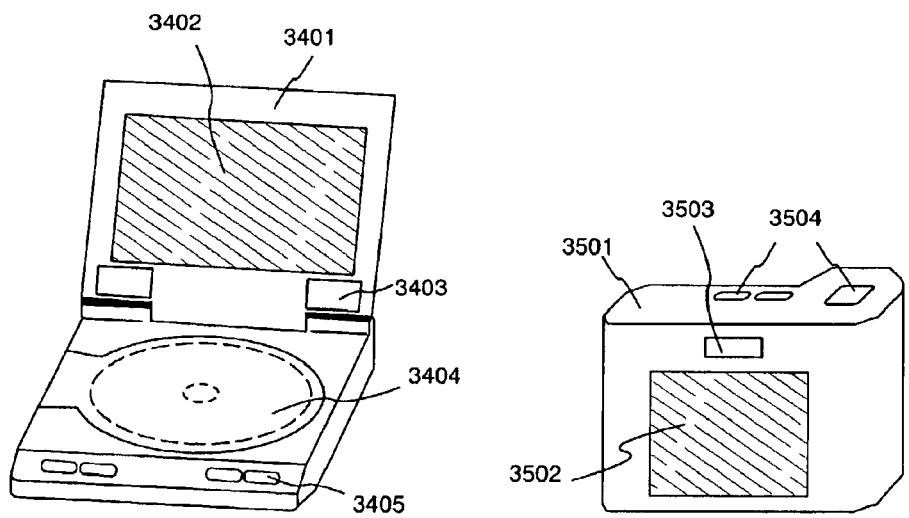
FIG. 14E
FIG. 14F FIG. 16A
FIG. 16B
FIG. 16C
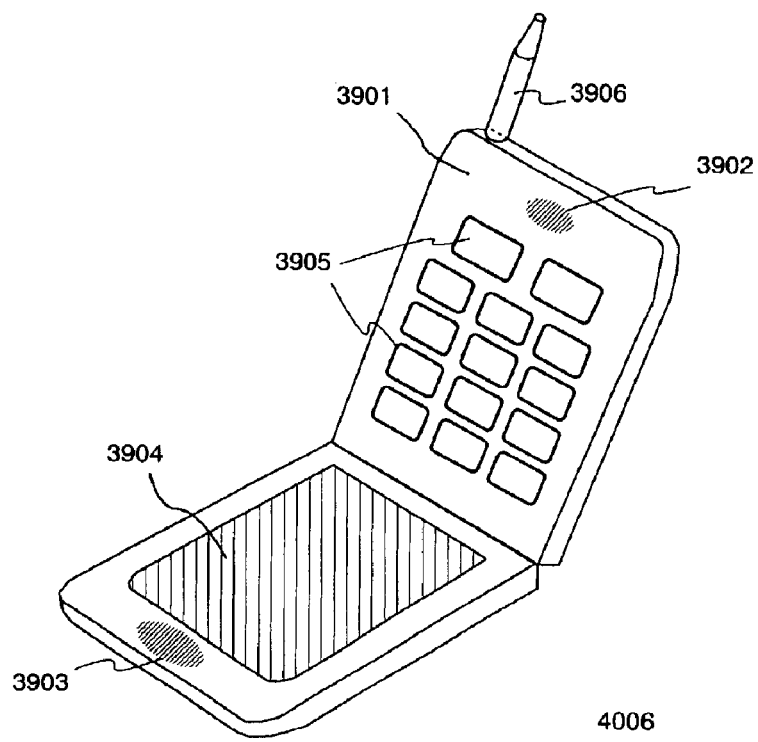
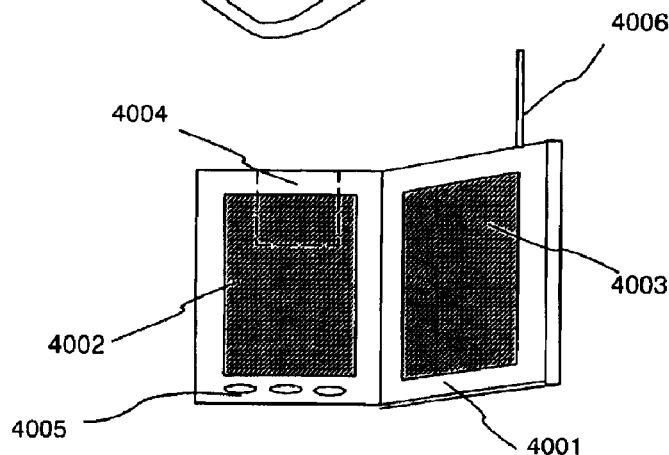
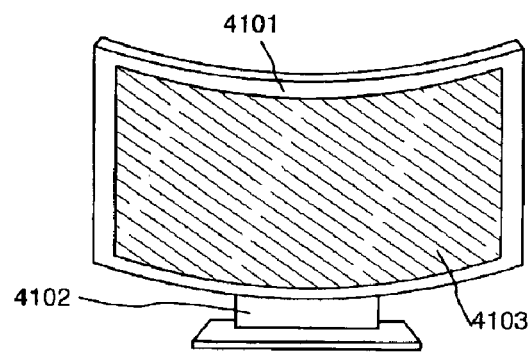

LASER IRRADIATION APPARATUS, LASER IRRADIATION METHOD, AND MANUFACTURING METHOD FOR A SEMICONDUCTOR DEVICE

BACKGROUND OF THE INVENTION

1. Field of the Invention

The present invention relates to a laser irradiation method for irradiating laser beams and to a laser irradiation apparatus (an apparatus including a laser and an optical system that leads laser beams produced from the laser to an irradiation object) for implementing the irradiation method. Further, the present invention relates to a manufacturing method for a semiconductor device that is manufactured according to steps including irradiation of a laser beam. The semiconductor device mentioned above refers to an electrooptical device such as a liquid crystal display device or a light-emitting device and to an electronic device including the electrooptical device as a component.

2. Description of the Related Art

Techniques having widely been researched in recent years include those for producing a crystalline semiconductor film in such a manner that a semiconductor film formed on an insulating substrate formed of, for example, a glass substrate is annealed with laser beam light and is crystallized to improve crystallinity. Throughout the present specification, the crystalline semiconductor film refers either to a semiconductor film including a crystallized area or to a semiconductor film crystallized overall.

Compared with a synthetic quartz glass substrate, a glass substrate is advantageous in that a large area substrate can easily be produced at low costs. The laser is frequently used in crystallization for the glass substrate, because the glass substrate has a low melting point. The laser is advantageous in that it imparts a high energy to a semiconductor film without greatly increasing the temperature. Further, a significantly high throughput can be obtained in comparison to the case of a heat treatment performed with an electrothermal oven.

A crystalline semiconductor film formed with laser beam irradiation exhibits a high mobility. Thus, the semiconductor film is used for, for example, an active-matrix liquid crystal display device. The active-matrix liquid crystal display device is manufactured such that thin film transistors (TFTs) are formed using crystalline semiconductor films on a single glass substrate so that the TFTs are used for either pixel portions or pixel portions with a driver circuit.

Laser annealing is performed in a method in which a high-power pulse laser beam generated by an excimer laser or the like is processed by an optical system to be shaped as, for example, a several centimeter square spot, a 10 centimeter or longer line, or a rectangle, on an irradiation surface. Concurrently, the laser beam is scanned (alternatively, an irradiation position of the laser beam is moved relative to the irradiation surface). Since this method exhibits high productivity and provides industrial advantages, the method is preferentially employed.

In particular, according to the method of using the spot-like laser beam, scanning needs to be performed backward-forward and rightward-leftward on an irradiation surface. However, according to the method of using the linear laser beam, the laser beam can be irradiated to the entirety of the irradiation subject surface only by performing scanning in a direction perpendicular to the linear direction of the linear beam. The scanning is thus performed in the direction perpendicular to the linear direction for the reason that the direction is the most effective in terms of productivity. As a current mainstream technology, laser annealing is performed using the method in which a laser beam emitted from an excimer laser of a pulse-oscillation type is processed using an appropriate optical system, and a beam thereby shaped linear on an irradiation surface is used for irradiation.

As an example, FIGS. 6A and 6B show a configuration of an optical system disclosed in JP 2001-244213 A. The optical system is used to process a laser beam on an irradiation surface and to thereby shape the beam linear. First, the configuration will be described with reference to a side view in FIGS. 6A and 6B. A laser beam passed through a laser oscillator 101 travels straightforward with a divergence angle. Subsequently, the laser beam is processed into collimated beams through cylindrical lenses 104 and 105, and split beams then converge on an irradiation surface 107 via a mirror 106. Since the optical system shown in FIGS. 6A and 6B are easily influenced by variations in the divergence angle, the system needs to be controlled. Thus, the configuration preferably uses an optical system that produces collimated beams that are not influenced by the divergence angle. Although a completely collimated beam cannot be produced, divergence of the beam can be minimized. An optical system of the type described above is called a "beam collimator". In the configuration shown in FIGS. 6A and 6B, the cylindrical lenses 104 and 105 serve as collimators. The mirror 106 is shaped to have a plurality of parabolic mirrors each having a different curvature (mirrors each having only a unidirectional curvature), on which the beams converge at the focal points and are then led to reach the irradiation surface 107. In the example, four parabolic mirrors are provided. Since the curvatures of parabolic surfaces are different from one another, the focal points are also different from one another. According to parabolic mirrors 106a to 106d, energies of linear beams are homogenized in the beam cross direction, and the beam lengths thereof are determined.

Next, the configuration will be described with reference to a top view in FIG. 6B. A laser beam passed through the laser oscillator 101 is split through a cylindrical array lens 102 in a direction perpendicular to the traveling direction of the laser beam light. In the present specification, the aforementioned direction is referred to as a "transverse direction". With a mirror inserted in the course of the optical system, the transverse direction is variable to a direction of light bent by the mirror. In this configuration, the laser beam is split into four laser beams. The split laser beams converge through a cylindrical lens 103 into a single laser beam on the irradiation surface 107.

Generally, as a lens for transmitting laser beams is repeatedly used, the lens gradually deteriorates and becomes unusable. However, dissimilar to such a lens, a mirror does not transmit laser beams but reflects the laser beams impinged against its surface. That is, only the surface of the mirror is deteriorated. Thus, even in a case where the mirror is used for a long time to an extent of causing the surface thereof to deteriorate, the mirror can be rectified to be usable by recoating the deteriorated surface. From this viewpoint, the mirror is economically advantageous.

However, an energy density distribution of a laser beam formed on the irradiation surface 107 according to the optical system shown in FIGS. 6A and 6B are as shown in FIG. 7. Such a distribution is attributed to continual variations in the energy density. The variations are caused due to lens aberrations in the individual mirrors and differences in optical lengths to the irradiation surface. Since inhomogeneous energy density distributions of the aforementioned type with individual mirrors are synthesized on the irradiation surface 107, inhomogeneity is increased significant.

The energy density distribution of the beam formed on the irradiation surface 107 is preferably homogeneous to perform homogeneous laser annealing for an irradiation object. For example, when the energy density is homogeneous in processing a semiconductor film used as an irradiation object, the semiconductor film can be annealed homogeneous, thereby having homogeneous physical property. Consequently, a TFT manufactured using the semiconductor film thus annealed reduces the inhomogeneity in electrical characteristics. Consequently, improvement can be attained in operational characteristics and reliability of a semiconductor device produced using TFTs manufactured in the manner described above.

SUMMARY OF THE INVENTION

Accordingly, an object of the present invention is to provide a laser irradiation apparatus for forming a laser beam exhibiting a homogeneous energy density distribution on an irradiation surface. Another object of the present invention is to provide a laser irradiation method using the laser irradiation apparatus. Still another object of the present invention is to provide a method of manufacturing a semiconductor device by using a semiconductor film obtained by performing crystallization of the semiconductor film and activation of an impurity element according to the laser irradiation method.

The present invention causes laser beams exhibiting energy density distributions different in inhomogeneity on an irradiation surface to be overlapped, and thereby forms a laser beam exhibiting a homogeneous energy density distribution.

A laser irradiation apparatus disclosed in the present specification has a configuration including a laser and at least two mirrors each having a concave surface for unidirectionally homogenizing an energy density of laser light emitted from the laser. A focal position of a first mirror exists between the first mirror and an irradiation surface. A focal position of a second mirror does not exist between the second mirror and the irradiation surface, but exists behind the irradiation surface.

In the above-described configuration, a laser is one of solid-state, gas, and metal lasers of a continuous oscillation or pulse oscillation type. Examples of the solid-state laser include a YAG laser, an $YVO_4$ laser, an YLF laser, a $YAlO_3$ laser, a glass laser, a ruby laser, an alexandrite laser, and a Ti:sapphire laser of a continuous oscillations or pulse oscillation type. Examples of the gas laser include an excimer laser, an Ar laser, a Kr laser, and a $CO_2$ laser of a continuous oscillations or pulse oscillation type. Examples of the metal laser include a helium-cadmium laser, a copper vapor laser, and a gold vapor laser of a continuous oscillations or pulse oscillation type.

In the above-described configuration, the laser beam is preferably modulated into a harmonic by using a nonlinear optical device. For example, a YAG laser is known to produce a laser beam having a wavelength of 1,064 nm as a fundamental. The absorption coefficient of the source laser beam for a silicon film is very low, thereby making it difficult to crystallize an amorphous silicon film, which is a semiconductor film. However, using the nonlinear optical device enables the laser beam to be modulated into a shorter wavelength. In this case, as a harmonic, a second harmonic (532 nm) or a third harmonic (355 nm) is preferable. Since either of the harmonics has a high absorption coefficient for an amorphous silicon film, the harmonic can suitably be used for crystallization of the amorphous silicon film.

According to a configuration of a laser irradiation method of the present invention disclosed in the present specification, first and second mirrors individually having concave surfaces are used to irradiate the irradiation object with a laser beam exhibiting an energy density distribution unidirectionally homogenized either on the irradiation object or in the vicinity thereof. A focal position of a first mirror exists between the first mirror and an irradiation surface. A focal position of the second mirror does not exist between the second mirror and the irradiation surface, but exists behind the irradiation surface.

According to another configuration of a laser irradiation method of the present invention disclosed in the present specification, first and second mirrors individually having concave surfaces are used to split a first laser beam into second and third laser beams. The second laser beam converges through the first mirror, and an irradiation object is then irradiated. On the other hand, however, the third laser beam does not converge through the second mirror, and the same area of the irradiation object is irradiated with the laser beam.

In the above-described configuration, a laser is emitted from one of solid-state, gas, and metal lasers of a continuous oscillation or pulse oscillation type. Also, the laser beam is preferably modulated into a harmonic by using a nonlinear optical device.

According to a configuration of a method of manufacturing a semiconductor device disclosed in the present specification, first and second mirrors individually having concave surfaces are used to irradiate the semiconductor film with a laser beam exhibiting an energy density distribution unidirectionally homogenized either on the semiconductor film or in the vicinity thereof. A focal position of a first mirror exists between the first mirror and the semiconductor film. A focal position of the second mirror does not exist between the second mirror and the semiconductor film, but exists behind the semiconductor film.

According to another configuration of a method of manufacturing a semiconductor device of the present invention disclosed in the present specification, first and second mirrors individually having concave surfaces are used to split a first laser beam into second and third laser beams. The second laser beam converges through the first mirror, and the semiconductor film is then irradiated. On the other hand, however, the third laser beam does not converge through the second mirror, and the same area of the semiconductor film is irradiated with the laser beam.

In the above-described configuration, a laser beam is emitted from one of solid-state, gas, and metal lasers of a continuous oscillation or pulse oscillation type. Also, the laser beam is preferably modulated into a harmonic by using a nonlinear optical device.

In the above-described configuration, a substrate for forming the semiconductor film may be formed using one of, for example, a glass substrate, a quartz substrate, a plastics substrate, a metal substrate, and a flexible substrate. Examples of the glass substrate include those made of glass, such as barium borosilicate glass and alumino borosilicate glass. The flexible substrate refers to, for example, a film-state substrate made of PET, PES, PEN, acrylic resin, or the like. When a semiconductor device is manufactured using such a flexible substrate, the device can be expected to be lightweight. In this case, a barrier film formed of, for example, an aluminum film (AlON, AlN, AlO, or the like), a carbon film (DLC (diamond-like carbon) film or the like), or a SiN film, may either be mono-layered or be multi-layered either on an obverse surface or on obverse and reverse surfaces of the flexible substrate. This is preferable in terms of improving properties such as durability.

BRIEF DESCRIPTION OF THE DRAWINGS

In the accompanying drawings:

FIGS. 2A and 2B show an example of a laser irradiation apparatus disclosed in the present invention;

FIGS. 6A and 6B show an optical system disclosed in JP 2001-244213 A;

FIGS. 14A to 14F show examples of a semiconductor device;

FIGS. 16A to 16C show examples of a semiconductor device.

DETAILED DESCRIPTION OF THE PREFERRED EMBODIMENTS

[Embodiment Mode 1]

Hereinbelow, a first embodiment of the present invention will be described using FIGS. 1A to 1D.

Figure 1A:
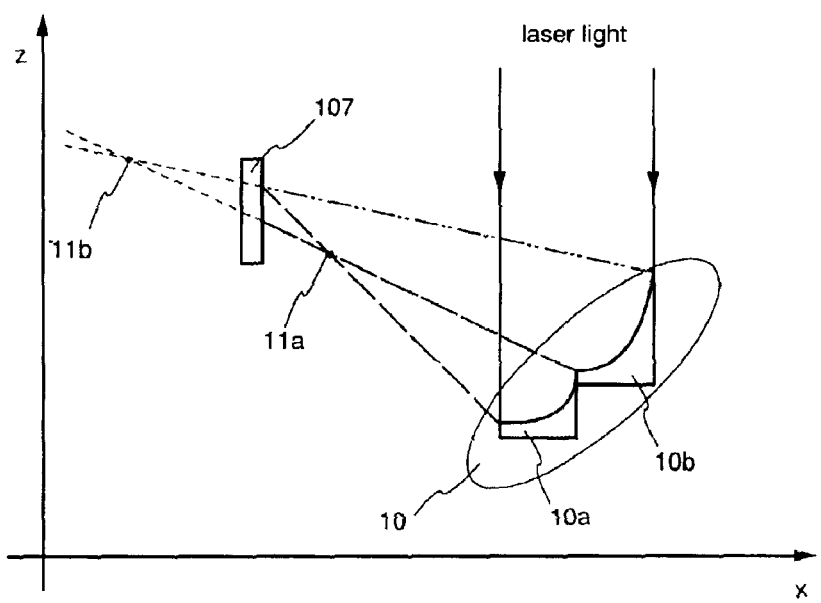
FIGS. 1A to 1D show an example of a laser irradiation apparatus disclosed in the present invention.

Referring to FIG. 1A, a laser beam is emitted from one of solid-state, gas, and metal lasers of a continuous oscillation or pulse oscillation type. Examples of the solid-state laser include a YAG laser, an $YVO_4$ laser, an YLF laser, a $YAlO_3$ laser, a glass laser, a ruby laser, an alexandrite laser, and a Ti:sapphire laser of a continuous oscillations or pulse oscillation type. Examples of the gas laser include an excimer laser, an Ar laser, a Kr laser, and a $CO_2$ laser of a continuous oscillations or pulse oscillation type. Examples of the metal laser include a helium-cadmium laser, a copper vapor laser, and a gold vapor laser of a continuous oscillations or pulse oscillation type. The laser beam is preferably modulated into a harmonic. Further, the laser beam is preferably processed into a collimated beam through, for example, a beam collimator. When the collimated beam is reflected by a mirror 10, focal positions match focal positions of individual mirrors; whereas, when scattering light is reflected by the mirror 10, focal positions deviate from the focal potions of the individual mirrors.

Subsequently, the laser beams reach an irradiation surface 107 via the mirror 10 formed of a plurality of mirrors. The mirror 10 is formed of concave mirrors 10a and 10b. A focal position 11a of the concave mirror 10a exists between the concave mirror 10a and the irradiation surface 107; that is, the focal position 11a exists ahead of the irradiation surface 107. The focal position 11b exists behind the irradiation surface 107, not between the concave mirror 10b and the irradiation surface 107. Curved surfaces of the individual concave mirrors 10a and 10b may either be formed of same parabolic surfaces or may be formed of mutually different parabolic surfaces. Still alternatively, each of the curved surfaces may be part of an ellipse.

Figure 1B:
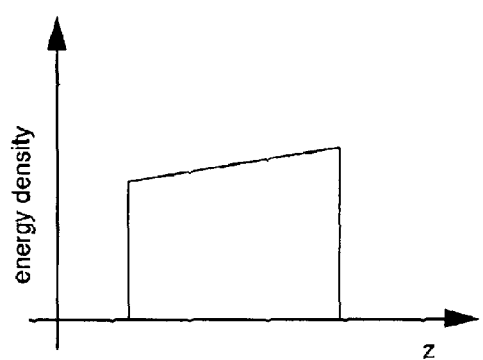

Since the focal position 11a of the concave mirror 10a exists ahead of the irradiation surface 107, the laser beam reflected by the concave mirror 10a diverges from the focal position, and then reaches the irradiation surface 107. At this time, an energy density distribution in the z-axis direction on the irradiation surface 107 takes place as shown in FIG. 1B.

Figure 1C:
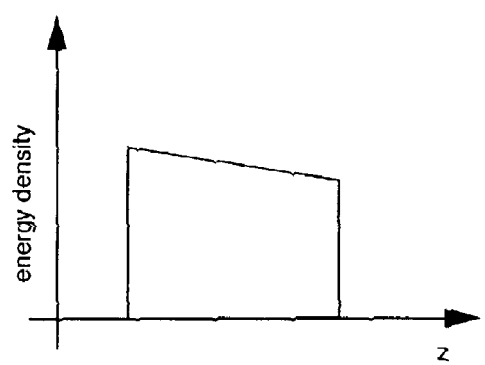

In contrast, since the focal position 11b of the concave mirror 10b exists behind the irradiation surface 107, the laser beam reflected by the concave mirror 10b converges, and concurrently reaches the irradiation surface 107. At this time, an energy density distribution in the z-axis direction on the irradiation surface 107 takes place as shown in FIG. 1C.

Figure 1D:
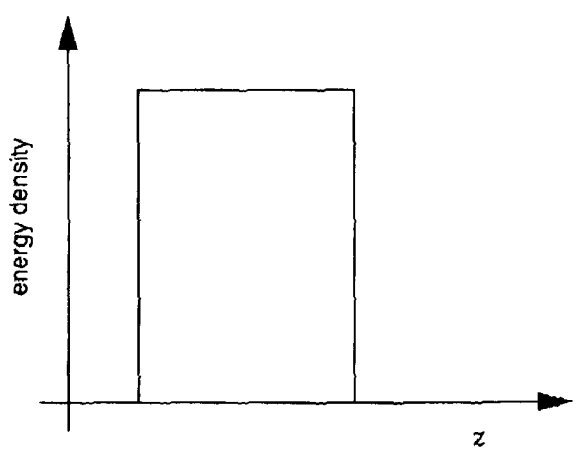

The individual laser beams passed via the concave mirrors 10a and 10b are overlapped on the irradiation surface 107. An energy density distribution of the overlapped laser beam in the z-axis direction takes place as shown in FIG. 1D.

When laser annealing is performed for the irradiation object by using the thus-formed laser beam exhibiting a homogeneous energy density, homogeneous annealing can be implemented. For example, when the energy density on an irradiation surface is homogeneous in processing a semiconductor film used as an irradiation object, the semiconductor film can be annealed homogeneous, and properties of the semiconductor film can thereby be homogenized. Consequently, a TFT manufactured using the semiconductor film thus annealed reduces the inhomogeneity in electrical characteristics. Consequently, improvement can be attained in operational characteristics and reliability of a semiconductor device produced using TFTs manufactured in the manner described above.

This embodiment includes two mirrors as multiple mirrors, but the number of mirrors is not limited thereto as long as a plurality of mirrors are provided. In this case, preferably, a mirror having the focal position existing ahead of an irradiation surface and a mirror having the focal position existing behind the irradiation surface reflect laser beams having same amounts of energy. In addition, end portions of the individual mirrors may either be in contact with each other or be spaced away from each other. Further, for example, a micrometer is preferably provided to each of the mirrors to enable the mirror to be finely adjusted in either the x-axis or z-axis direction.

[Embodiment Mode 2]

Hereinbelow, a second embodiment using the present invention in an optical system forming linear beams will be described using FIGS. 2A and 2B.

The configuration shown in a side view will be described. A laser beam light emitted from a laser 101 travels straightforward with a divergence angle. Then, beam-waist positions are moved to the vicinity of a mirror 10 through cylindrical lenses 104 and 105, and split beams then converge on the irradiation surface 107 through the mirror 10. The laser 101 is one of solid-state, gas, and metal lasers of a continuous oscillation or pulse oscillation type. The laser beam is preferably modulated into a harmonic. The optical system shown in FIGS. 2A and 2B are easily influenced by variations in the divergence angle. This raises the necessity of controlling the system and a beam collimator is required. In FIGS. 2A and 2B, the cylindrical lenses 104 and 105 serve as beam collimators. The mirror 10 is shaped to have a plurality of parabolic mirrors (mirrors each having only a unidirectional curvature) of which curvatures are mutually different. Specifically, the mirror 10 is formed of mirrors 10a and 10b. The mirror 10a is used to once converge the beam at its focal point and then to lead the beam to reach the irradiation surface 107. The mirror 10b is used to converge the beam and concurrently to allow the beam to reach the irradiation surface 107. Thus, the two parabolic mirrors are provided. The mirror 10 has already been described in detail. In the present specification, "α" represents a coefficient of "$x^2$" in each expression for a parabola or an ellipse.

Next, the configuration will be described with reference to a top view in FIG. 2B. A laser beam emitted from the laser 101 is split through a cylindrical array lens 102 in a direction perpendicular to the traveling direction of the laser beam. In the present specification, the aforementioned direction is referred to as a "transverse direction". With a mirror inserted in the course of the optical system, the transverse direction is variable to a direction of the beam refracted by the mirror. In this configuration, the beam is split into four laser beams. The split laser beams converge through a cylindrical lens 103 into one laser beam on the irradiation surface 107.

In the manner described above, a linear beam homogenized in the long axis direction and the short axis direction is formed.

An irradiation object can be annealed homogeneous by performing laser annealing with the linear beam having homogeneous energy density. For example, when the energy density on the irradiation surface is homogeneous in processing a semiconductor film used as an irradiation object, the semiconductor film can be annealed homogeneous, and properties of the semiconductor film can thereby be homogenized. Consequently, a TFT manufactured using the semiconductor film thus annealed reduces the inhomogeneity in electrical characteristics. As a result, improvement can be attained in operational characteristics and reliability of a semiconductor device produced using TFTs manufactured in the manner described above.

This embodiment includes two mirrors as multiple mirrors, but the number of the mirrors is not limited thereto as long as a plurality of mirrors are provided. In this case, end portions of the individual mirrors either may be in contact with each other or may be spaced away from each other.

[Embodiment Mode 3]

Hereinbelow, a third embodiment of the present invention will be described using FIGS. 3A to 3D. Specifically, a shape of a mirror 12 formed of multiple mirrors will be described.

Figure 3A:
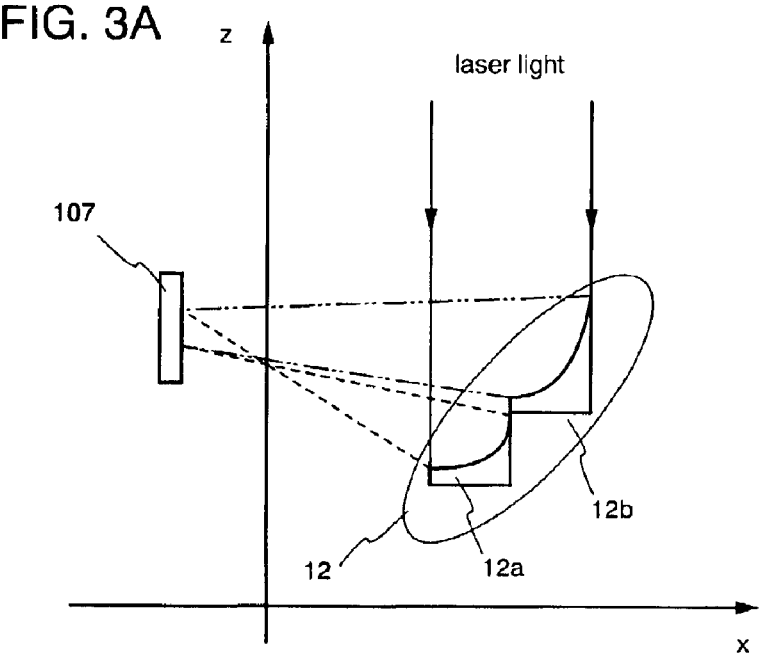
FIGS. 3A to 3D show an example of a laser irradiation apparatus disclosed in the present invention.

With reference to FIG. 3A, similar to the first embodiment, a laser beam is emitted from one of solid-state, gas, and metal lasers of a continuous oscillation or pulse oscillation type. The laser beam is preferably modulated into a harmonic. In addition, the laser beam is preferably processed into a collimated beam through, for example, a beam collimator.

The laser beams reach an irradiation surface 107 via the mirror 12 formed of multiple mirrors. Specifically, the mirror 12 is formed of concave mirrors 12a and 12b. The focal distance of the mirror 12a is set between the mirror 12a and the irradiation surface 107. The focal distance of the mirror 12b is set behind the irradiation surface 107, not between the mirror 12b and the irradiation surface 107. Hereinbelow, methods for determining shapes of the individual mirrors 12a and 12b in the above-described configuration will be described.

This embodiment is assumed to form a laser beam having a z-axial length of 0.4 mm on the irradiation surface 107 set at a position of x=−3, 75.3≦z≦75.7. The mirror 12a is assumed as a portion from x=119 on a parabola that satisfies the following expression.

[Expression 1]

$$z = \frac{1}{300}x^2 \qquad (1)$$

In this case, since the irradiation surface 107 has been determined, a range of x in the expression (1) corresponds to a portion expressed by 119≦x≦135.67 according to an intersection of a straight line that connects the end of the irradiation surface 107 and the focal point in the expression (1) and the parabola that satisfies the expression (1). The focal point of the parabola expressed by the expression (1) exists at the position (0, 75) on a front side of the irradiation surface 107.

Next, a shape of the mirror 12b is determined. The curvature of the mirror 12b is imparted greater than or equal to the curvature of the mirror 12a. The curvature is thus imparted so that the laser beam reflected by the mirror 12b is not blocked off by the mirror 12a, and the focal position of the mirror 12b exists behind the irradiation surface 107. Many shapes satisfying the conditions are available for the mirror 12b. However, in this embodiment, a parabola satisfying the following expression (2) is used for the mirror 12b:

[Expression 2]

$$z = \frac{1}{299}x^2 \qquad (2)$$

The x axis is aligned to the end of the mirror 12a to enable the laser beam to irradiate the entirety of the irradiation surface 107 without an unirradiated portion remaining. The width of the mirror 12b along the x axis is rendered identical to the width of the mirror 12a along the x axis. Specifically, the width is 135.67≦x≦152.34. The width is thus rendered for the reason that since laser beams exhibiting mutually different energy density distributions are overlapped on the irradiation surface 107, when the amounts of energy of laser beams are the same, homogenization of the beams is thereby facilitated. Subsequently, the focal point of the parabola satisfying the expression (2) is linked by straight lines to the individual z-axis values z=61.56, 77.62 at the x-axis values x=135.67, 152.34. Then, a line segment is obtained that is parallel to the z axis and that has the same length between their two ends as the length of the irradiation surface 107 existing on the straight line.

Subsequently, the parabola expressed by the expression (2) is moved toward the x axis and the z axis so that the obtained line segment is aligned to the irradiation surface 107. A new parabola is thereby determined. The parabola can easily be determined using optical simulation software. The parabola thus obtained satisfies

[Expression 3]

$$z = \frac{1}{299}(x+6.2)^2 - 0.74 \qquad (3)$$

The shape of the mirror 12b can be determined by using a range of $135.67 \leq x \leq 152.34$ of the parabola. As is apparent, the focal point of the parabola satisfying the expression (3) is located at (−6.2, 74.875) on the rear side of the irradiation surface 107.

It was proved that the shapes can thus be determined for the mirror 12a having the focal position existing ahead of the irradiation surface 107 and the mirror 12b having the focal position existing behind the irradiation surface 107.

Figure 3B:
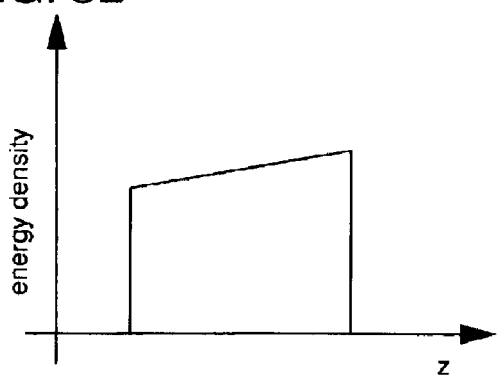
Figure 3C:
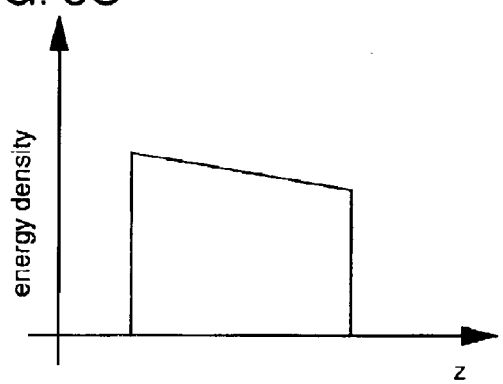
Figure 3D:
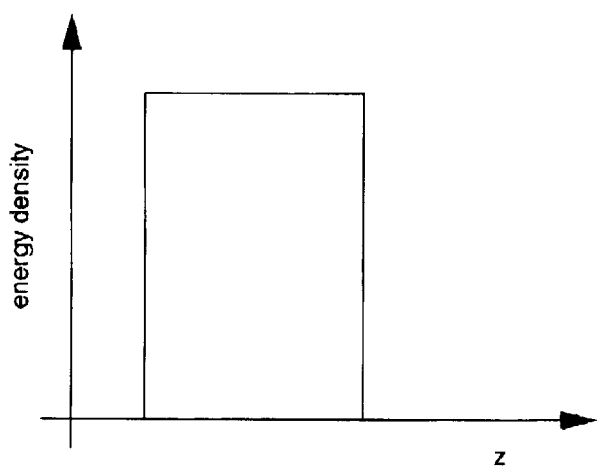

On the irradiation surface 107, laser beams obtained via the mirrors 12a and 12b individually exhibit inhomogeneous energy density distributions shown in FIGS. 3B and 3C. However, an energy density distribution of an overlapped laser beam in z-axis direction is homogeneous, as shown in FIG. 3D.

An irradiation object can be annealed homogeneous by performing laser annealing with the thus-formed laser beam having a homogeneous energy density. For example, when the energy density on the irradiation surface is homogeneous in processing a semiconductor film used as an irradiation object, the semiconductor film can be annealed homogeneous, and properties of the semiconductor film can thereby be homogenized. Consequently, a TFT manufactured using the semiconductor film thus annealed reduces the inhomogeneity in electrical characteristics. As a result, improvement can be attained in operational characteristics and reliability of a semiconductor device produced using TFTs manufactured in the manner described above.

This embodiment may be combined with the second embodiment.

[Embodiment Mode 4]

Hereinbelow, a fourth embodiment of the present invention will be described using FIGS. 4A to 4D. Specifically, the shape of a mirror 13 formed of multiple mirrors will be described.

Figure 4A:
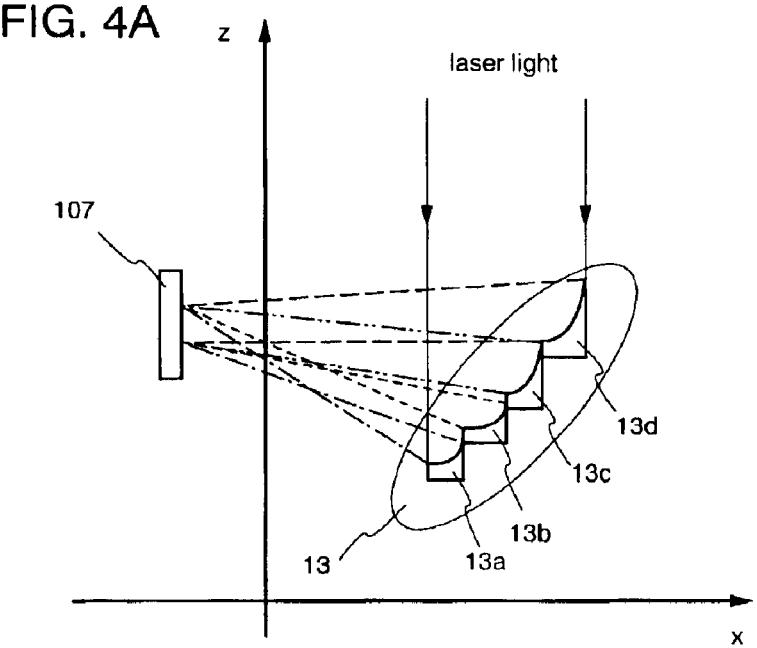
FIGS. 4A to 4D show an example of a laser irradiation apparatus disclosed in the present invention.

With reference to FIG. 4A, similar to the first embodiment, a laser beam is emitted from one of solid-state, gas, and metal lasers of a continuous oscillation or pulse oscillation type. The laser beam is preferably modulated into a harmonic. In addition, the laser beam is preferably processed into a collimated beam through, for example, a beam collimator.

Split laser beams reach an irradiation surface 107 via the mirror 13 formed of multiple mirrors. Specifically, the mirror 13 is formed of concave mirrors 13a to 13d. The focal distances of the respective mirrors 13a and 13b are set between the mirrors 13a and 13b and the irradiation surface 107; that is, the focal distances are set ahead of the irradiation surface 107. On the other hand, the focal distances of the individual mirrors 13c and 13d are set behind the irradiation surface 107, not between the individual mirrors 13c and 13d and the irradiation surface 107. Hereinbelow, methods for determining the shapes of the individual mirrors 13a to 13d in the above-described configuration will be described.

This embodiment is assumed to form a laser beam having a z-axial length of 0.4 mm on the irradiation surface 107 set at the position x=−3.75, $3 \leq z \leq 75.7$. The mirror 13a is assumed as a portion from x=119 on a parabola that satisfies

[Expression 4]

$$z = \frac{1}{300}x^2 - 1.2 \qquad (4)$$

In this case, since the irradiation surface 107 has been determined, a range of x in the expression (4) corresponds to a portion expressed by $119 \leq x \leq 135.67$ according to an intersection of a straight line that connects the end of the irradiation surface 107 and the focal point in the expression (4) and the parabola that satisfies the expression (1). The focal point of the parabola satisfying the expression (4) is positioned at (0, 73.8) on a front side of the irradiation surface 107.

Next, the shape of the mirror 13b is determined. The curvature of the mirror 13b is imparted greater than or equal to the curvature of the mirror 13a. The curvature is thus imparted because the distance to the irradiation surface 107 is longer than that from the mirror 13a. Many shapes satisfying the condition are available for the mirror 13b. However, in this embodiment, the curvature of a parabola for the mirror 13b is imparted identical to that for the mirror 13a, and the parabola is moved only toward the z-axis direction to be aligned to the irradiation surface 107. Accordingly, the shape of the mirror 13b is determined as expressed by

[Expression 5]

$$z = \frac{1}{300}x^2 - 0.8 \qquad (5)$$

The x axis of the mirror 13b is aligned to the end of the mirror 13a to enable the laser beam to irradiate entirety of the irradiation surface 107 without an unirradiated portion remaining. The width of the mirror 13b along the x axis is determined to be $127 \leq x \leq 136.67$ according to the irradiation surface 107 and the expression (5).

Subsequently, shapes of the mirrors 13c and 13d are determined. The individual focal distances of the mirrors 13c and 13d are set longer than the distances between the mirrors 13c and 13d and the irradiation surface 107. The shapes of the mirrors 13c and 13d can be determined according to the methods in the third embodiment. However, the widths of the mirrors 13a and 13b on the x axis are rendered identical to the widths of the mirrors 13c and 13d to impart same amounts of energy to laser beams reflected by the mirrors 13a and 13b and the mirrors 13c and 13d. The widths are thus rendered for the reason that since laser beams exhibiting mutually different energy density distributions are overlapped on the irradiation surface 107, when the amounts of energy of laser beams are the same, homogenization is thereby facilitated.

The shapes of the mirrors 13c and 13d are obtained according to the methods in the third embodiment, as expressed by

[Expression 6]

$$z = \frac{1}{299.8}(x+13.5)^2 - 0.11 \qquad (6)$$

$(135.67 \leq x \leq 143.67)$

[Expression 7]

$$z = \frac{1}{296}(x+12.6)^2 - 0.46 \quad (7)$$

$$(143.67 \leq x \leq 152.34)$$

It was proved that the shapes can thus be determined for the mirrors 13a and 13b individually having the focal positions existing ahead of the irradiation surface 107 and the mirrors 13c and 13d individually having the focal positions existing behind the irradiation surface 107.

Figure 4B:
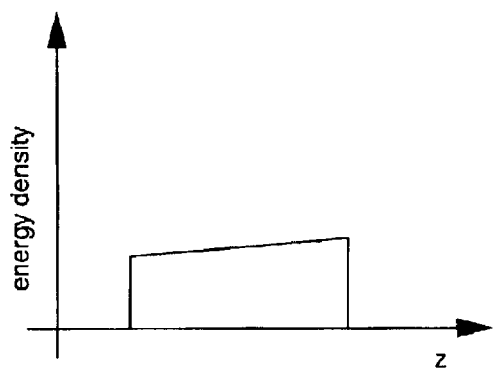
Figure 4C:
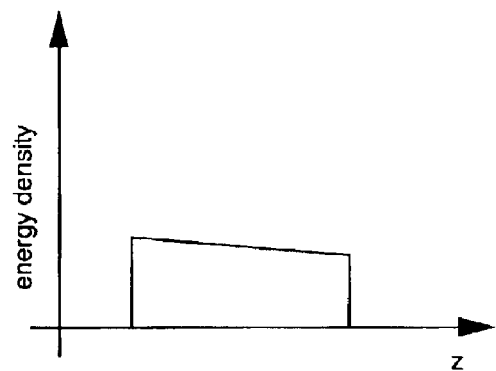
Figure 4D:
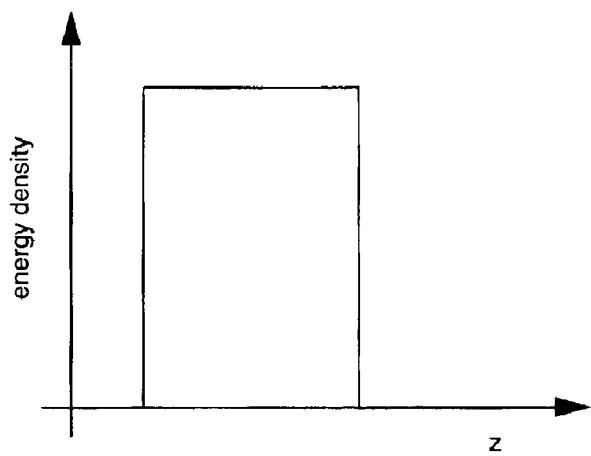

On the irradiation surface 107, individual laser beams obtained via the mirrors 13a and 13b exhibit an energy density distribution shown in FIG. 4B. Also, individual laser beams obtained via the mirrors 13c and 13d exhibit an energy density distribution shown in FIG. 4C. These beams are overlapped on the irradiation surface 107; and an overlapped beam exhibits a homogeneous density distribution in the z-axis direction, as shown in FIG. 4D.

An irradiation object can be annealed homogeneous by performing laser annealing with the thus-formed laser beam having the homogeneous energy density. For example, when the energy density on the irradiation surface is homogeneous in processing a semiconductor film used as an irradiation object, the semiconductor film can be annealed homogeneous, and properties of the semiconductor film can thereby be homogenized. Consequently, a TFT manufactured using the semiconductor film thus annealed reduces the inhomogeneity in electrical characteristics. As a result, improvement can be attained in operational characteristics and reliability of a semiconductor device produced using TFTs manufactured in the manner described above.

[Embodiment Mode 5]

Hereinbelow, a fifth embodiment of the present invention will be described using FIGS. 5A to 5D. Specifically, the shape of a mirror 14 formed of multiple mirrors will be described.

Figure 5A:
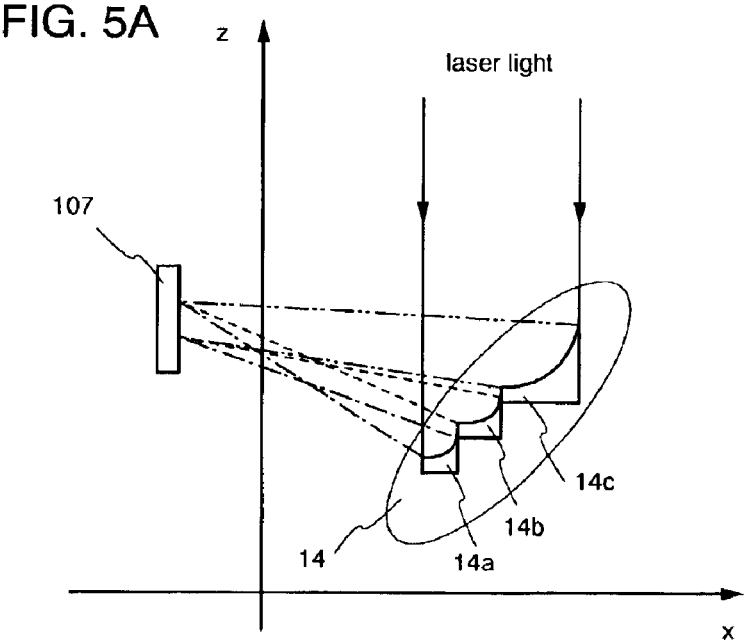
FIGS. 5A to 5D show an example of a laser irradiation apparatus disclosed in the present invention.
Figure 5B:
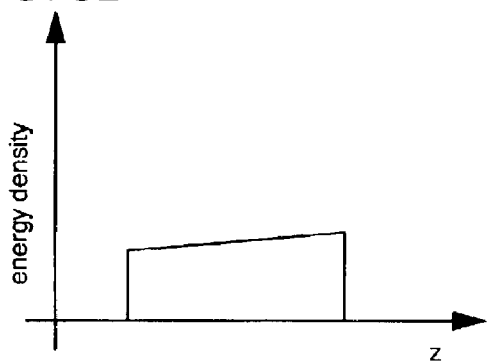
Figure 5C:
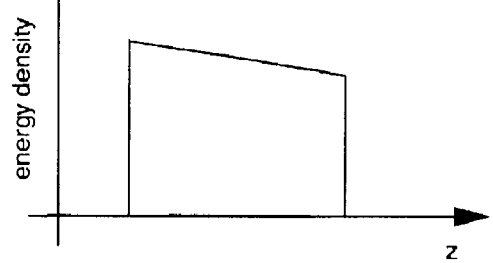

With reference to FIG. 5A, similar to the first to fourth embodiments, a laser beam is emitted from one of solid-state, gas, and metal lasers of a continuous oscillation or pulse oscillation type. The laser beam is preferably modulated into a harmonic. In addition, the laser beam is preferably processed into a collimated beam through, for example, a beam collimator.

Split laser beams reach an irradiation surface 107 via the mirror 14 formed of multiple mirrors. Specifically, the mirror 14 is formed of concave mirrors 14a to 14c. The focal distances of the respective mirrors 14a and 14b are set between the mirrors 14a and 14b and the irradiation surface 107. On the other hand, the focal distance of the mirror 14c is set behind the irradiation surface 107, not between the mirror 14c and the irradiation surface 107. Hereinbelow, methods for determining the shapes of the individual mirrors 14a to 14d in the above-described configuration will be described.

This embodiment is assumed to form a laser beam having a z-axial length of 0.4 mm on the irradiation surface 107 set to satisfy x=−3,75.3≦z≦75.7. The mirrors 14a and 14b have the same shapes as those of the mirrors 13a and 13b. Specifically, the mirrors 14a and 14b are each shaped to satisfy

[Expression 8]

$$z = \frac{1}{300}x^2 - 1.2 \quad (4)$$

$$(119 \leq x \leq 127)$$

[Expression 9]

$$z = \frac{1}{300}x^2 - 0.8 \quad (5)$$

$$(127 \leq x \leq 135.67)$$

Next, the shape of the mirror 14c is determined. The focal distance of the mirror 14c is set longer than the distances between the mirror 14c and the irradiation surface 107. The shape of the mirror 14c can be determined according to the methods in the third embodiment. However, the width of each of the mirrors 14a and 14b is rendered identical to the width of the mirror 14c to impart same amounts of energy to laser beams reflected by the mirrors 14a and 14b and the mirror 14c. The width is thus rendered for the reason that since laser beams exhibiting mutually different energy density distributions are overlapped on the irradiation surface 107, when the amounts of energy of laser beams are the same, homogenization is thereby facilitated.

The shape of the mirror 14c is obtained according to the methods in the third embodiment to satisfy

[Expression 10]

$$z = \frac{1}{298}(x+9.4)^2 - 0.9 \quad (8)$$

$$(135.67 \leq x \leq 152.34)$$

It was proved that the shapes can thus be determined for the mirrors 14a and 14b individually having the focal positions existing ahead of the irradiation surface 107 and the mirror 14c having the focal positions existing behind the irradiation surface 107.

Figure 5D:
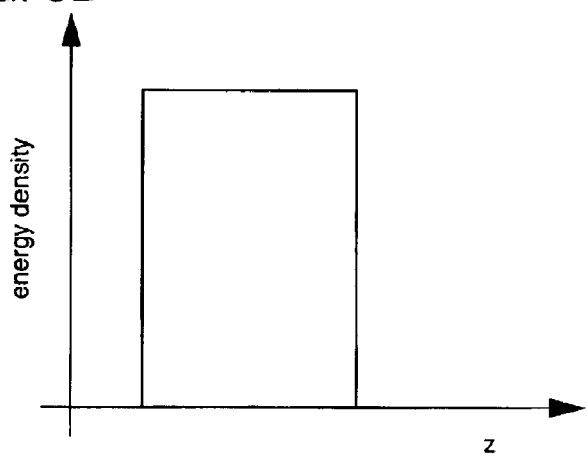
Figure 7:
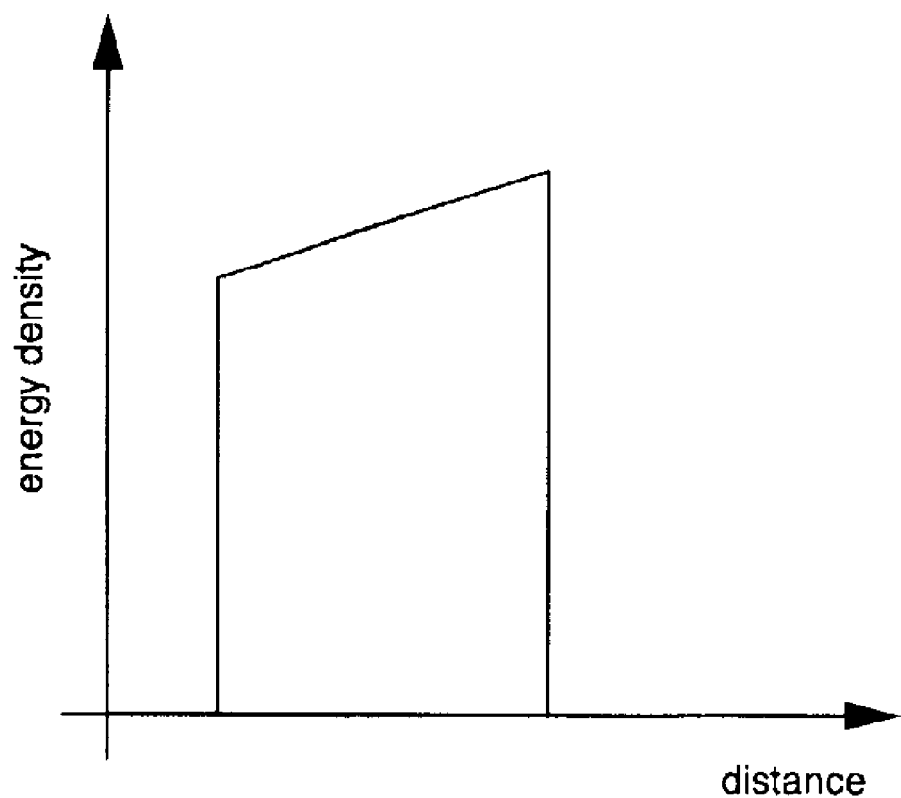
FIG. 7 shows an example energy distribution of a laser beam formed on an irradiation surface according to the optical system shown in FIGS. 6A and 6B.

Individual laser beams obtained via the mirrors 14a to 14c are overlapped on the irradiation surface 107. The individual laser beam obtained via the mirrors 14a and 14b exhibit an energy density distribution on the irradiation surface shown in FIG. 5B. In addition, the laser beam obtained via the mirror 14c exhibits an energy density distribution on the irradiation surface shown in FIG. 5C. An overlapped laser beam exhibits a homogeneous energy density distribution along the z-axis direction, as shown in FIG. 5D.

An irradiation object can be annealed homogeneous by performing laser annealing with the thus-formed laser beam having the homogeneous energy density. For example, when the energy density on the irradiation surface is homogeneous in processing a semiconductor film used as an irradiation object, the semiconductor film can be annealed homogeneous, and properties of the semiconductor film can thereby be homogenized. Consequently, a TFT manufactured using the semiconductor film thus annealed reduces the inhomogeneity in electrical characteristics. As a result, improvement can be attained in operational characteristics and reliability of a semiconductor device produced using TFTs manufactured in the manner described above.

[Embodiment 1]

A method of manufacturing an active matrix substrate is explained in this example using FIGS. 8A to 11. A substrate on which a CMOS circuit, a driver circuit, and a pixel portion having a TFT pixel and a holding capacity are integrally formed is called active matrix substrate for convenience.

First, a substrate 400 made of glass such as barium borosilicate glass or aluminum borosilicate glass is used in this example. Note that substrates such as quartz substrates, silicon substrates, metallic substrates, and stainless steel substrates having an insulating film formed on the substrate surface may also be used as the substrate 400. Further, a plastic substrate having heat resisting properties capable of enduring the processing temperatures used in this example may be used, a flexible substrate also may be used. Because this invention can easily form a linear beam with a uniform energy distribution, it is possible that annealing a larger area substrate is conducted effectively by using a plurality of linear beams.

Next, a base film 401 made of an insulating film such as a silicon oxide film, a silicon nitride film, or a silicon oxynitride film is then formed on the substrate 400 by the known method. A two-layer structure is used as the base film 401 in this example, but a single layer of the above-mentioned insulating film may also be used, and a structure in which more than two layers are laminated may also be used.

Next, semiconductor layers are formed on the base film. First of all, semiconductor film is formed with a thickness of 25 to 200 nm (preferably 30 to 150 nm) by a known method (such as the sputtering method, the LPCVD method, and the plasma CVD method). Then, the semiconductor film is crystallized by a laser crystallization method. As the laser crystallization method, the laser beam irradiates to the semiconductor film by applying one of Examples 1 to 5 or by freely combining any one of Examples 1 to 5. It is preferable that a solid-state laser of continuous oscillation or pulse oscillation, a gas laser, or metallic laser is used. Note that, as the solid-state laser, there may be given a YAG laser of continuous oscillation or pulse oscillation, a $YVO_4$ laser, a YLF laser, a $YAlO_3$ laser, a glass laser, a ruby laser, an alexandrite laser, a Ti:sapphire laser, and the like. As a the gas laser, there may be given a excimer laser of continuous oscillation or pulse oscillation, Ar laser, Kr laser, $CO_2$ laser, or the like. And as the metallic laser, there may be given a helium cadmium laser of continuous oscillation or pulse oscillation, a copper vapor laser, or a gold vapor laser. Of course, not only the laser crystallization method but also any other known crystallization method (RTA, the thermal crystallization method using a furnace annealing, the thermal crystallization method using metallic elements which promote crystallization) may also be combined. The semiconductor film may be an amorphous semiconductor film, a microcrystal semiconductor film or a crystalline semiconductor film. Alternatively, the semiconductor film may be a compound semiconductor film having an amorphous structure such as amorphous silicon germanium film, amorphous silicon carbide film and the like.

In this example, plasma CVD method is used to form an amorphous silicon film with a thickness of 50 nm, and then the thermal crystallization method using metallic elements, which promote crystallization, and laser crystallization method are used for the amorphous silicon film. Nickel is used as a metal element, and is introduced onto the amorphous silicon film by a solution coating method. Then heat treatment is conducted at 550° C. for five hour, whereby obtaining a first crystalline silicon film. Subsequently, laser annealing is performed, and a second crystalline silicon film is obtained thereby in accordance with first embodiment.

Irradiating the laser beam to the first crystalline silicon film, and changing the first crystalline silicon film to the second crystalline silicon film improve the crystallinity of the second crystalline silicon film. When the excimer laser of pulse oscillation is used, it is preferable that 300 Hz of frequency and 100 to 1000 $mJ/cm^2$ (typically, 200 to 800 $mJ/cm^2$) of laser energy density are used. At this moment, laser beam may be overlapped by 50 to 98%.

Of course, although a TFT can be formed by using the first crystalline silicon film, it is preferable that the second crystalline silicon film is used to form the TFT since the second crystalline silicon film has an improved crystallinity, and electric characteristics of TFT are improved. For instance, when TFT is formed by using the second crystalline silicon film, the mobility is extremely improved with about 500 to 600 $cm^2/Vs$.

The semiconductor layers 402 to 406 are formed by performing patterning processing on thus obtained semiconductor film by using the photolithography method.

Doping of a very small amount of an impurity element (boron or phosphorus) may be performed after forming the semiconductor layers 402 to 406 in order to control a TFT threshold value.

A gate insulating film 407 is formed next, covering the semiconductor layers 402 to 406. The gate insulating film 407 is formed by an insulating film containing silicon with a thickness of 40 to 150 nm using plasma CVD or sputtering. In this example, a silicon oxynitride film having a film thickness of 110 nm is formed by plasma CVD method. The gate insulating film is of course not limited to a silicon oxynitride film, and other insulating films containing silicon may be used in a single layer or in a lamination structure.

Further, if a silicon oxide film is used, it can be formed by plasma CVD method with a mixture of TEOS (Tetraethyl Orthosilicate) and $O_2$, at a reaction pressure of 40 Pa, with the substrate temperature set from 300 to 400° C., and by discharging at a high frequency (13.56 MHz) electric power density of 0.5 to 0.8 $W/cm^2$. Good characteristics as a gate insulating film can be obtained by subsequently performing thermal annealing, at between 400 and 500° C., of the silicon oxide film thus manufactured.

A first conductive film 408 having a film thickness of 20 to 100 nm, and a second conductive film 409 having a film thickness of 100 to 400 nm are then formed and laminated on the gate insulating film 407. The first conductive film 408, made from a TaN film having a film thickness of 30 nm, and the second conductive film 409, made from a W film having a film thickness of 370 nm, are formed and laminated in this example. The TaN film is formed by sputtering, and sputtering of a Ta target is performed in a nitrogen atmosphere. Further, the W film is formed by sputtering using a W target. In addition, the W film can also be formed by thermal CVD method using tungsten hexafluoride ($WF_6$). Whichever is used, it is necessary to be able to make the film become low resistance in order to use it as a gate electrode, and it is preferable that the resistivity of the W film be made less than 20 $\mu\Omega cm$.

Note that although the first conductive film 408 is TaN and the second conductive film 409 is W in this example, there are no particular limitations placed on the conductive films. The first conductive film 408 and the second conductive film 409 may also be formed from an element selected from the group consisting of Ta, W, Ti, Mo, Al, Cu, Cr, and Nd, or from an alloy material having one of these elements as its main constituent, or from a chemical compound of these elements. Further, a semiconductor film, typically a polycrystalline crystalline silicon film, into which an impurity element such as phosphorus is doped may also be used, as may an AgPdCu alloy.

Figure 8A:
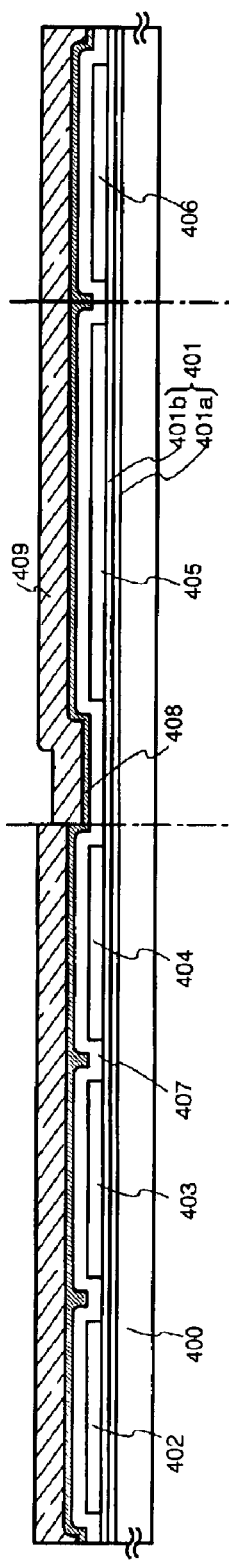
FIGS. 8A to 8C are cross-sectional views showing manufacturing steps for pixel thin film transistors (TFTs) and driver circuit TFTs.
Figure 8B:
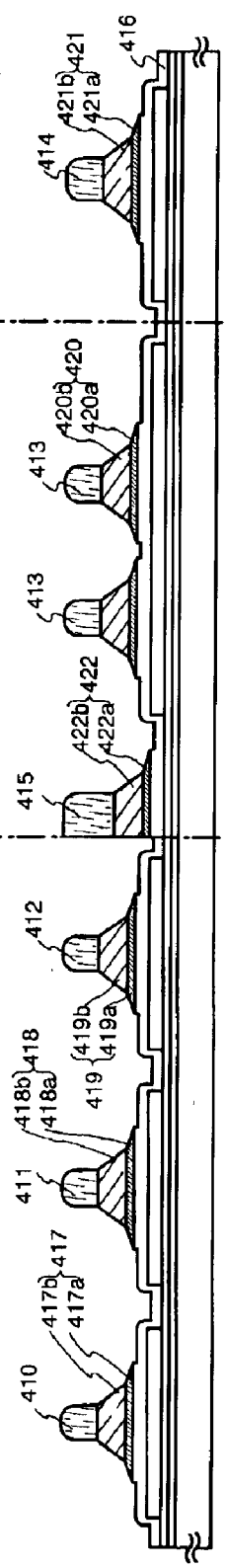

Masks 410 to 415 are formed next from resist using a photolithography method, and a first etching process is performed in order to form electrodes and wirings. The first etching processing is performed in accordance with first and second etching conditions (FIG. 8B). An ICP (Inductively Coupled Plasma) etching method is used as a first etching condition in this example. A gas mixture of $CF_4$, $Cl_2$, and $O_2$ is used as an etching gas, the gas flow rates are set to 25:25:10 (sccm), respectively, a plasma is generated by supplying a 500 W RF (13.56 MHz) electric power to a coil shape electrode at a pressure of 1 Pa, and etching is performed. A 150 W RF (13.56 MHz) electric power is also applied to the substrate side (sample stage), thereby applying a substantially negative self-bias voltage. The W film is etched under the first etching conditions, and the edge portion of the first conductive layer is made into a tapered shape.

The etching conditions are changed to a second etching condition without removing the masks 410 to 415 made of resist. A gas mixture of $CF_4$ and $Cl_2$ is used as an etching gas, the gas flow rates are set to 30:30 (sccm), respectively, a plasma is generated by applying a 500 W RF (13.56 MHz) electric power to a coil shape electrode at a pressure of 1 Pa, and etching is performed for approximately 30 seconds. A 20 W RF (13.56 MHz) electric power is also supplied to the substrate side (sample stage), thereby applying a substantially negative self-bias voltage. The W film and the TaN film are both etched by on the same order by the second etching conditions using the gas mixture of $CF_4$ and $Cl_2$. Note that the etching time may be increased on the order of 10 to 20% in order to perform etching such that no residue remains on the gate insulating film.

Edge portions of the first conductive layer and the second conductive layer are made into a tapered shape in accordance with the effect of a bias voltage, applied to the substrate side, by making the shapes of the resist masks suitable with the above-mentioned first etching condition. The angle of the tapered portions is from 15 to 45°. First shape conductive layers 417 to 422 (first conductive layers 417a to 422a, and second conductive layers 417b to 422b) are thus formed from the first conductive layers and the second conductive layers by the first etching process. Reference numeral 416 denotes a gate insulating film, and regions not covered by the first shape conductive layers 417 to 422 become thinner by approximately 20 to 50 nm through etching.

Figure 8C:
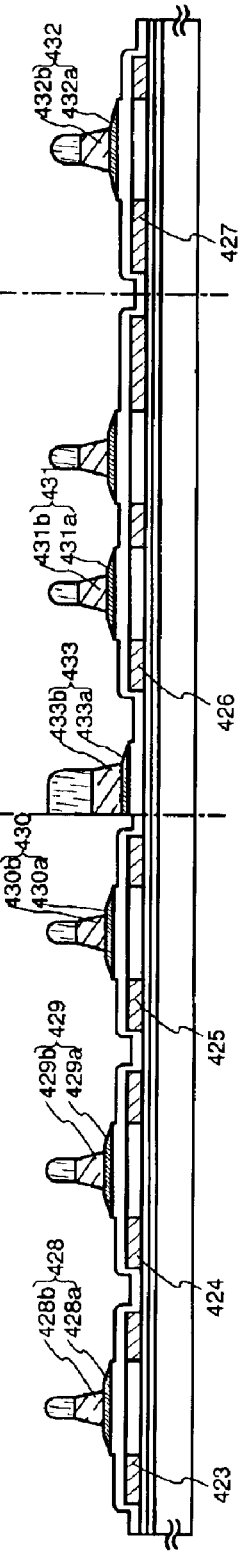

A second etching process is then performed without removing the masks made of resist (FIG. 8C). Here, W film is selectively etched by using $CF_4$, $Cl_2$, and $O_2$ for the etching gas. At this time, the second conductive layers 428b to 433b are formed by the second etching process. On the other hand, the first conductive layers 417a to 422a are hardly etched and the second shape conductive layers 428 to 433 are formed.

A first doping process is then performed without removing the masks made of resist and the semiconductor layer is added to the impurity element which imparts n-type at a low concentration. The doping process may be performed by ion doping method or ion injection method. Ion doping is performed with process conditions in which the dosage is set from $1 \times 10^{13}$ to $5 \times 10^{14}/cm^2$, and the acceleration voltage is set between 40 to 80 keV. Doping is performed in this example with the dosage set to $1.5 \times 10^{13}/cm^2$, and the acceleration voltage set to 60 keV. An element belonging to the group 15, typically phosphorus (P) or arsenic (As) is used as an impurity element which imparts n-type. Phosphorus (P) is used here. In this case the conductive layers 428 to 433 act as masks with respect to the impurity element which imparts n-type conductivity, and the impurity regions 423 to 427 are formed in a self-aligning manner. The impurity element which imparts n-type is added to the impurity regions 423 to 427 at a concentration in a range of $1 \times 10^{18}$ to $1 \times 10^{20}/cm^3$.

Figure 9A:
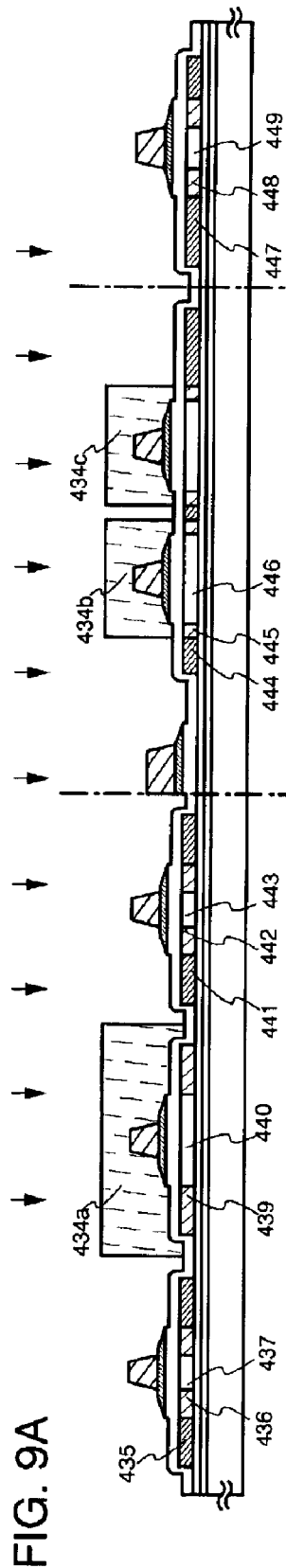
FIGS. 9A to 9C are cross-sectional views showing manufacturing steps for pixel TFTs and driver circuit TFTs.

Next, after removing the masks made of resist, new masks 434a to 434c made of resist are formed, and the second doping process is performed in higher acceleration voltage than the first doping process. Ion doping is performed with process conditions in which the dosage is set from $1 \times 10^{13}$ to $1 \times 10^{15}/cm^2$, and the acceleration voltage is set between 60 to 120 keV. The doping process is performed by using the second conductive layers 428b, 430b and 432b as masks and the semiconductor layer under the tapered portion of the first conductive layer is added to the impurity element. Continuously the acceleration voltage is lowered than the second doping process, the third doping process is done, and the state of FIG. 9A is obtained. Ion doping method is performed with process conditions in which the dosage is set from $1 \times 10^{15}$ to $1 \times 10^{17}/cm^2$, and the acceleration voltage is set between 50 to 100 keV. Low concentration impurity regions 436, 442 and 448 overlapping with the first conductive layer are added to the impurity element, which imparts n-type within the range of the density of $1 \times 10^{18}$ to $5 \times 10^{19}/cm^2$ by the second doping process and the third doping process and high concentration impurity regions 435, 441, 444 and 447 are added to the impurity element, which imparts n-type within the range of the density of $1 \times 10^{19}$ to $5 \times 10^{21}/cm^2$.

Of course, the second doping process and the third doping process can be one-time doping processes by making it to a suitable acceleration voltage and it is also possible to form the low concentration impurity region and high concentration impurity region.

Figure 9B:
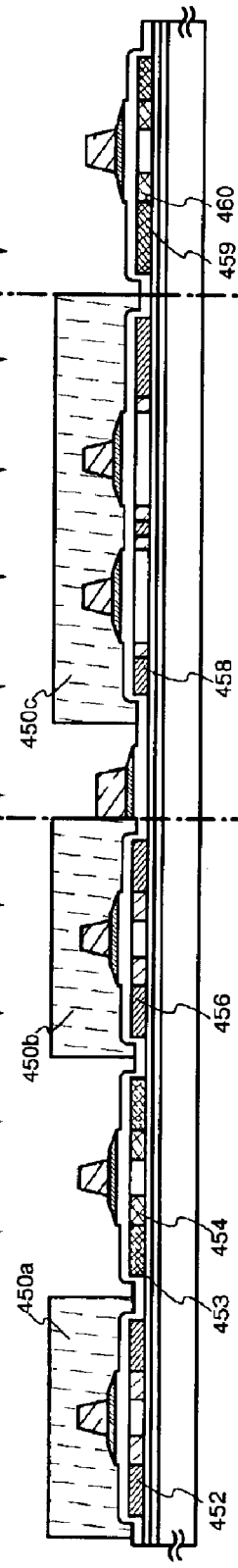
Figure 9C:
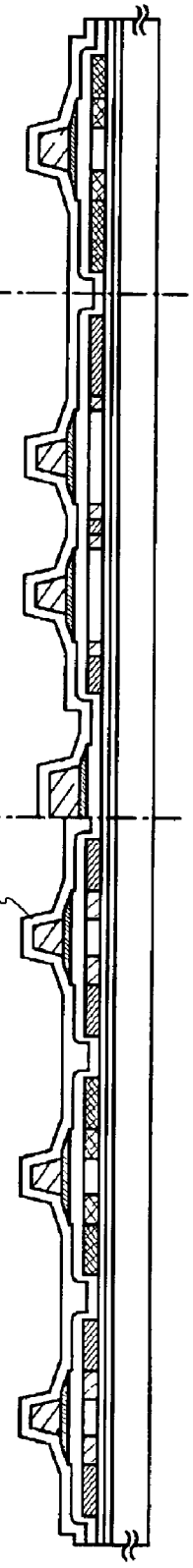

Next, after removing the masks made of resist, new masks 450a to 450c made from resist are formed and the fourth doping process is performed. Impurity regions 453, 454, 459 and 460, to which an impurity element imparting a conductivity type opposite to that of the above one conductivity type is added, are formed in accordance with the fourth doping process in the semiconductor films which become active layers of the p-channel type TFTs. The second conductive layers 429b to 432b are used as masks with respect to the impurity element, and an impurity element which imparts p-type conductivity is added to form the impurity regions in a self-aligning manner. The impurity regions 453, 454, 459 and 460 are formed by ion doping method using diborane ($B_2H_6$) in this example (FIG. 9B). The semiconductor layers for forming the n-channel type TFT are covered with the masks 450a to 450c made of resist when the fourth doping process is performed. Phosphorus is added at different concentrations into the impurity regions 447 and 448 by the first to third doping processes. However, by performing doping such that the concentration of the impurity element which imparts p-type conductivity becomes from $1 \times 10^{19}$ to $5 \times 10^{21}$ atoms/$cm^3$ in the respective regions, no problems develop in making the regions function as source regions and drain regions of the p-channel type TFT.

The impurity regions are thus formed in the respective semiconductor layers by the steps up through this point.

A first interlayer insulating film 461 is formed next after removing the masks 450a to 450c made of resist. This first interlayer insulating film 461 is formed from an insulating film containing silicon, having a thickness of 100 to 200 nm, by using plasma CVD method or sputtering method. A silicon oxynitride film having a thickness of 150 nm is formed by plasma CVD method in this example. The first interlayer insulating film 461 is of course not limited to a silicon oxynitride film, and other insulating films containing silicon may also be used, as a single layer or a lamination structure.

Subsequently, a recovery of the crystallinity of the semiconductor layer and an activation of the impurity elements added to the respective semiconductor layers are performed by irradiating the laser beam. As the laser activation, the laser beam irradiates to the semiconductor film by applying one of Examples 1 to 5 or by freely combining with these examples. It is preferable that a solid-state laser of a continuous oscillation or a pulse oscillation, a gas laser, or metallic laser is used. Note that, as the solid-state laser, there may be given a YAG laser of a continuous oscillation or a pulse oscillation, a $YVO_4$ laser, a YLF laser, a $YAlO_3$ laser, a glass laser, a ruby laser, an alexandrite laser, a Ti: sapphire laser, and the like. As a the gas laser, there may be given a excimer laser of continuous oscillation or pulse oscillation (It is said that a excimer laser of continuous oscillation can be developed, but it is not in practical use yet), Ar laser, Kr laser, $CO_2$ laser, or the like. And as the metallic laser, there may be given a helium cadmium laser of a continuous oscillation or a pulse oscillation, a copper vapor laser, or a gold vapor laser. At this moment, if a continuous oscillation laser is used, about 0.01 to 100 $MW/cm^2$ (preferably 0.01 to 10 $MW/cm^2$) is necessary for the energy density of laser beam. The substrate is relatively moved to the laser beam at a speed of about 0.5 to 2000 cm/s. And, if a pulse oscillation laser is used, it is preferable that 50 to 1000 $mJ/cm^2$ (typically, 50 to 500 $mJ/cm^2$) of laser energy density is used. At this moment, laser beam may be overlapped by 50 to 98%. Besides laser annealing method, thermal annealing method or rapid thermal annealing method (RTA method) and the like can be applied.

Further, the activation may also be performed before the formation of a first interlayer insulating film. However, if the wiring material used is weak with respect to heat, then it is preferable to perform the activation processing after forming an interlayer insulating film (an insulating film having silicon as its main constituent, for example a silicon nitride film) in order to protect the wirings and the like, as in this example.

Then, a heat treatment can also be performed (at 300 to 550° C. for 1 to 12 hours) and it is possible to conduct a hydrogenation. This process is one of terminating dangling bonds in the semiconductor layers by hydrogen contained within the first interlayer insulating film 461. The semiconductor layers can be hydrogenated whether or not the first interlayer insulating film exists. Plasma hydrogenation (using hydrogen excited by a plasma), and a heat treatment for 1 to 12 hours at a temperature of 300 to 450° C. in an atmosphere containing hydrogen of from 3 to 100% may also be performed as other means of hydrogenation.

Subsequently, a second interlayer insulating film 462 made from an inorganic insulating film material or from an organic insulating material is formed on the first interlayer insulating film 461. An acrylic resin film having a film thickness of 1.6 μm is formed in this example, and the material used may have a viscosity from 10 to 1000 cp, preferably between 40 to 200 cp. A material in which unevenness is formed on its surface is used.

In order to prevent mirror reflection, the surface of a pixel electrode is made uneven by forming a second interlayer insulating film which forms an uneven surface in this example. Further, the pixel electrode surface can be made to be uneven and have light scattering characteristics, and therefore a convex portion may also be formed in a region below the pixel electrode. The formation of the convex portion can be performed by the same photomask as that for forming the TFTs, and therefore it can be formed without increasing the number of process steps. Note that the convex portion may also be formed appropriately on the substrate of the pixel portion region except the wirings and TFTs. In this way, unevenness is formed in the surface of the pixel electrode along the unevenness formed in the surface of the insulating film which covers the convex portion.

A film having a level surface may also be used as the second interlayer insulating film 462. In this case, it is preferable that the surface be made uneven by an added process such as a known sandblasting process or etching process to prevent mirror reflection, and thereby increasing whiteness by scattering reflected light.

Figure 10:
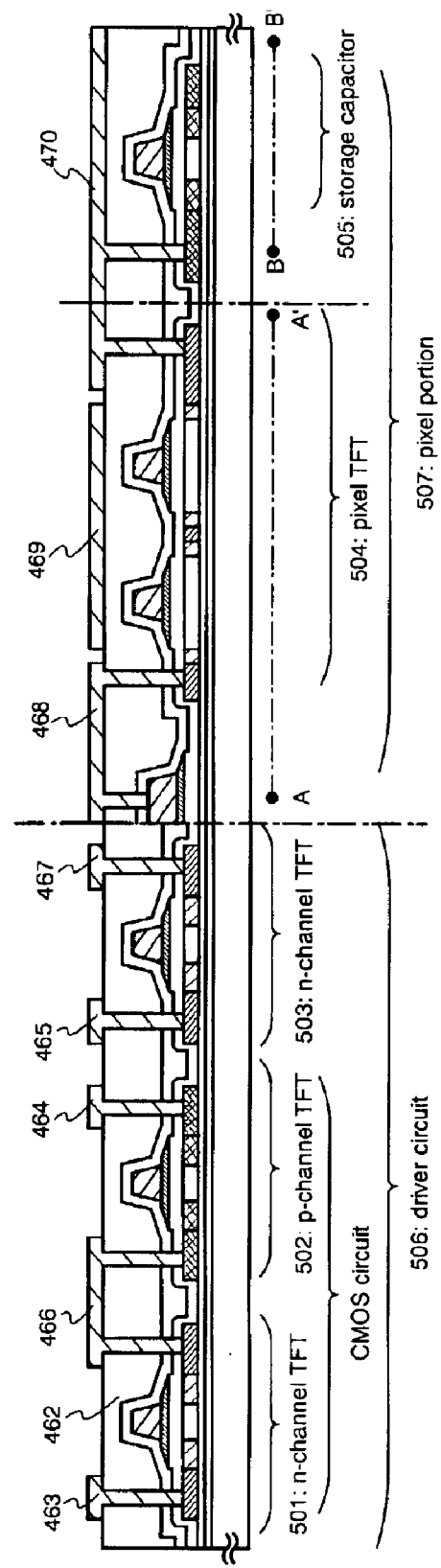
FIG. 10 is a cross-sectional view showing a manufacturing step for a pixel TFT and a driver circuit TFT.

Wirings 463 to 467 for electrically connecting respective impurity regions are then formed in a driver circuit 506. Note that a lamination film of a Ti film having a thickness of 50 nm and an alloy film (an alloy of Al and Ti) having a thickness of 500 nm is patterned in order to form the wirings. Of course, it is not limited to the two-layer structure, the single-layer structure or the lamination structure more than three layers may also be acceptable. Further, the wiring materials are not limited to Al and Ti. For example, Al and Cu are formed on TaN film, and the lamination film forming the Ti film is formed by the patterning and form wiring (FIG. 10).

Further, a pixel electrode 470, a gate wiring 469, and a connection electrode 468 are formed in a pixel portion 507. An electrical connection is formed with the pixel TFT and the source wiring (a laminate layer of 433a and 433b) by the connection electrode 468. Further, the gate wiring 469 forms an electrical connection with the gate electrode of the pixel TFT. The pixel electrode 470 forms an electrical connection with the drain region 444 of the pixel TFT, and in addition, forms an electrical connection with the semiconductor layer 459 that functions as one electrode forming a storage capacitor. It is preferable to use a material having superior reflectivity, such as a film having Al or Ag as its main constituent, or a lamination film of such films, as the pixel electrode 470.

A CMOS circuit composed of an n-channel TFT 501 and a p-channel TFT 502, a driver circuit 506 having an n-channel TFT 503, and the pixel portion 507 having a pixel TFT 504 and a storage capacitor 505 can thus be formed on the same substrate. The active matrix substrate is thus completed.

The n-channel TFT 501 of the driver circuit 506 has: a channel forming region 437; the low concentration impurity region 436 (GOLD region) which overlaps with the first conductive layer 428a that structures a portion of the gate electrode; and the high concentration impurity region 452 which functions as a source region or a drain region. The p-channel TFT 502, which forms the CMOS circuit with the n-channel TFT 501 and the electrode 466 by an electrical connection has: a channel forming region 440; the high concentration impurity region 453 functioning as a source region or a drain region; and the impurity region 454 in which the impurity elements imparting n-type and p-type are introduced. Further, the n-channel TFT 503 has: a channel forming region 443; the low concentration impurity region 442 (GOLD region) which overlaps with the first conductive layer 430a that structures a portion of the gate electrode; and the high concentration impurity region 456 which functions as a source region or a drain region.

The pixel TFT 504 of the pixel portion has: a channel forming region 446; the low concentration impurity region 445 (LDD region) formed on the outside of the gate electrode; and the high concentration impurity region 458 which functions as a source region or a drain region. Further, an impurity element which imparts n-type and an impurity element which imparts p-type are added to the semiconductor layer which functions as one electrode of the storage capacitor 505. The storage capacitor 505 comprises an electrode (lamination of 432a and 432b) and the semiconductor layer, with the insulating film 416 functioning as a dielectric.

Edge portions of the pixel electrodes are disposed so as to overlap with source wirings such that gaps between the pixel electrodes shield the light, without using a black matrix, with the pixel structure of this example.

Figure 11:
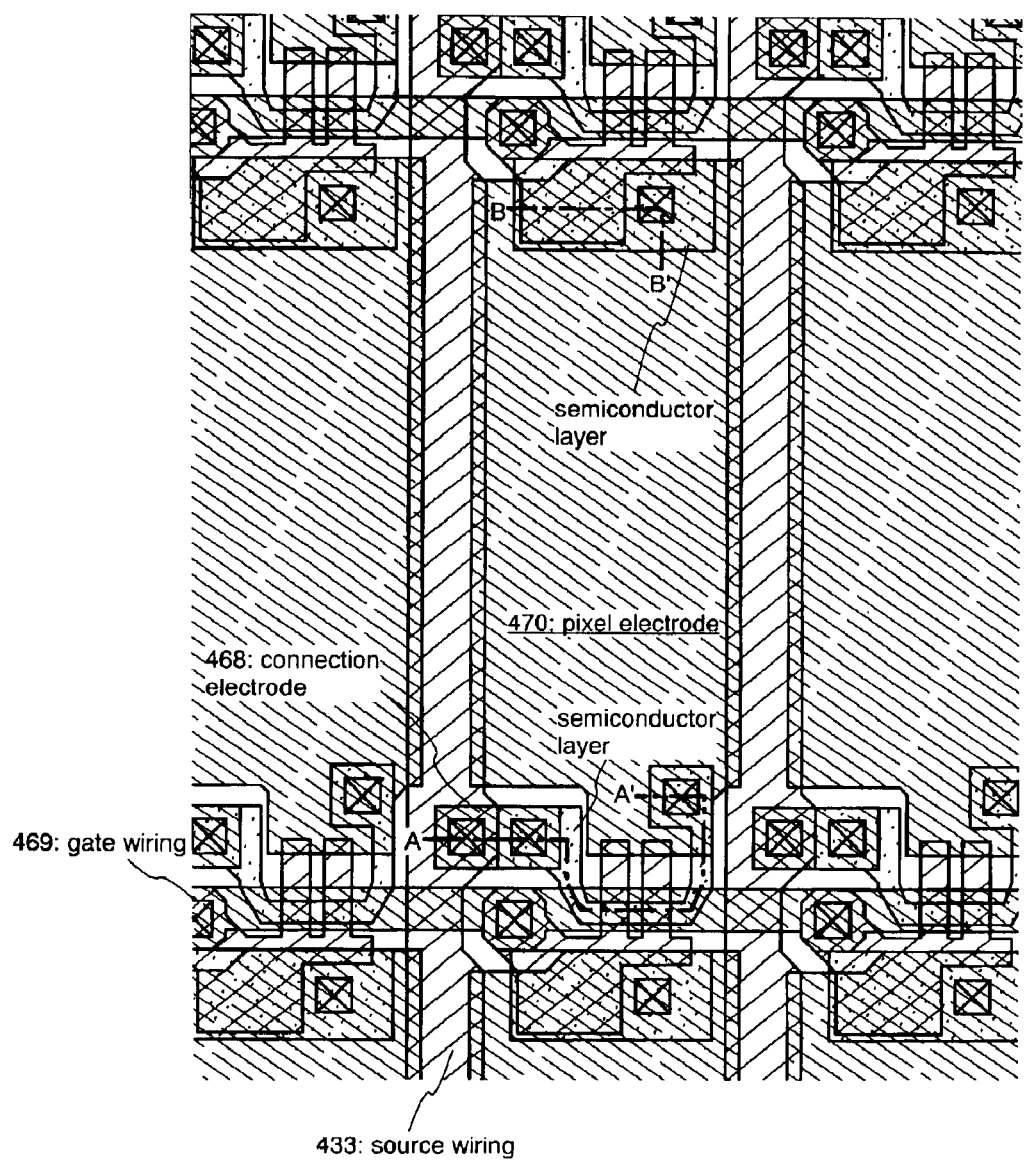
FIG. 11 is a top view showing the configuration of the pixel TFT.

An upper surface diagram of the pixel portion of the active matrix substrate manufactured in this example is shown in FIG. 11. Note that the same reference symbols are used for portions corresponding to those in FIGS. 8 to 11. A chain line A–A' in FIG. 10 corresponds to a cross sectional diagram cut along a chain line A–A' within FIG. 11. Further, a chain line B–B' in FIG. 10 corresponds to a cross sectional diagram cut along a chain line B–B' within FIG. 11.

[Embodiment 2]

Figure 12:
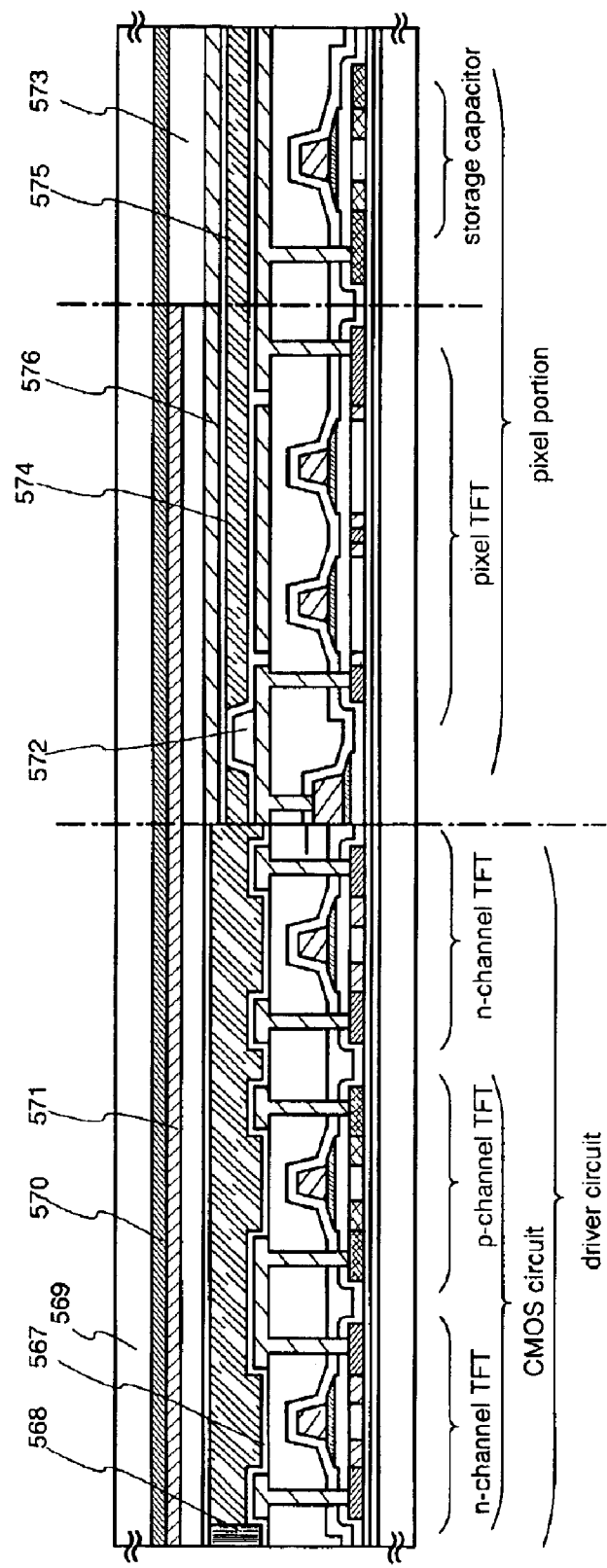
FIG. 12 is a cross-sectional view of an active-matrix liquid crystal display device.

A process of manufacturing a reflection type liquid crystal display device from the active matrix substrate manufactured in Example 5 is explained below in this example. FIG. 12 is used in the explanation.

An active matrix substrate in the state of FIG. 10 is first obtained in accordance with Example 1, an alignment film 567 is then formed on at least the pixel electrode 470 on the active matrix substrate of FIG. 10, and a rubbing process is performed. Note that, before forming the alignment film 567 in this example, columnar spacer 572 is formed in desired positions by patterning an organic resin film, such as an acrylic resin film and the like, in order to maintain a gap between substrates. Further, spherical spacers may also be distributed over the entire surface of the substrate as a substitute for the columnar spacers.

An opposing substrate 569 is prepared next. Coloring layers 570 and 571, and a leveling film 573 are then formed on the opposing substrate 569. The red coloring layer 570 and a blue coloring layer 571 are overlapped to form a light shielding portion. Furthermore, the light shielding portion may also be formed by overlapping a portion of the red coloring layer with a green coloring layer.

The substrate shown in Example 1 is used in this example. Therefore, with the top view of the pixel portion of Example 1 shown in FIG. 11, it is necessary that, at least, the gap between the gate wiring 469 and the pixel electrode 470, the gap between the gate wiring 469 and the connection electrode 468, and the gap between the connection electrode 468 and the pixel electrode 470 be shielded from light. Each of the coloring layers are arranged such that the light shielding portions made from the lamination of the coloring layers are formed in positions that must be shielded from light, and then are joined to the opposing substrate.

It is thus made possible to reduce the number of process steps by performing light shielding of the respective gaps between the pixels by using the light shielding portions, composed of the laminations of the coloring layers, without forming a light shielding layer such as a black mask and the like.

An opposing electrode 576 made from a transparent conductive film is formed on the leveling film 573 over at least the pixel portion, an alignment film 574 is formed over the entire surface of the opposing substrate, and a rubbing process is performed.

The active matrix substrate on which the pixel portion and the driver circuit are formed, and the opposing substrate are then joined by a sealing material 568. A filler is mixed into the sealing material 568, and the two substrates are joined while maintaining a uniform gap in accordance with the filler and the columnar spacers. A liquid crystal material 575 is then injected between both substrates, and the substrates are completely sealed by using a sealant (not shown in the figure). A known liquid crystal material may be used for the liquid crystal material 575. The reflection type liquid crystal display device shown in FIG. 12 is thus completed. The active matrix substrate or the opposing substrate is then cut into a desired shape if necessary. In addition, a polarizing plate (not shown in the figure) is attached to only the opposing substrate. An FPC is then attached using a known technique.

Liquid crystal display device made by above-mentioned method has TFT manufactured by using the semiconductor film thoroughly annealed because the laser beam with a very excellent uniformity of the energy distribution is irradiated. It is possible to become the one with enough operation characteristic and reliability of the above-mentioned liquid crystal display device. Such a liquid crystal display can be used as a display portion in various kinds of electronic equipment.

Note that it is possible to freely combine this example with First embodiments 1 to 5.

[Embodiment 3]

In this example, an example of manufacturing the light emitting device by using a manufacturing method of TFT shown in Example 1 that is used for forming an active matrix substrate. In this specification, the light emitting device is the general term for the display panel enclosed a light emitting element formed on the substrate between the aforesaid substrate and the cover member, and to the aforesaid display module equipped TFT with the aforesaid display panel. Incidentally, the light emitting element has a layer including a compound in which an electroluminescence can be obtained by applying an electric field (a light emitting layer), an anode, and a cathode. Meanwhile, the electroluminescence in organic compound includes the light emission (fluorescence) upon returning from the singlet-excited state to the ground state and the light emission (phosphorescence) upon returning from the triplet-excited state to the ground state, including any or both of light emission.

In this specification, all layers formed between the anode and the cathode in the light emitting element are defined as the organic light emitting layer. The light emitting layer, the hole injection layer, the electron injection layer, the hole transportation layer, and the electron transportation layer, etc. are concretely included in the organic light emitting layer. The light emitting element basically has the structure that the anode layer, the light emitting layer, and the cathode layer are sequentially laminated. In addition to this structure, the light emitting element may also has a structure that the anode layer, the hole injection layer, the light emitting layer, and the cathode layer are sequentially laminated or a structure that the anode layer, the hole injection layer, the light emitting layer, the hole transportation layer, and the cathode layer etc. are sequentially laminated.

Figure 13:
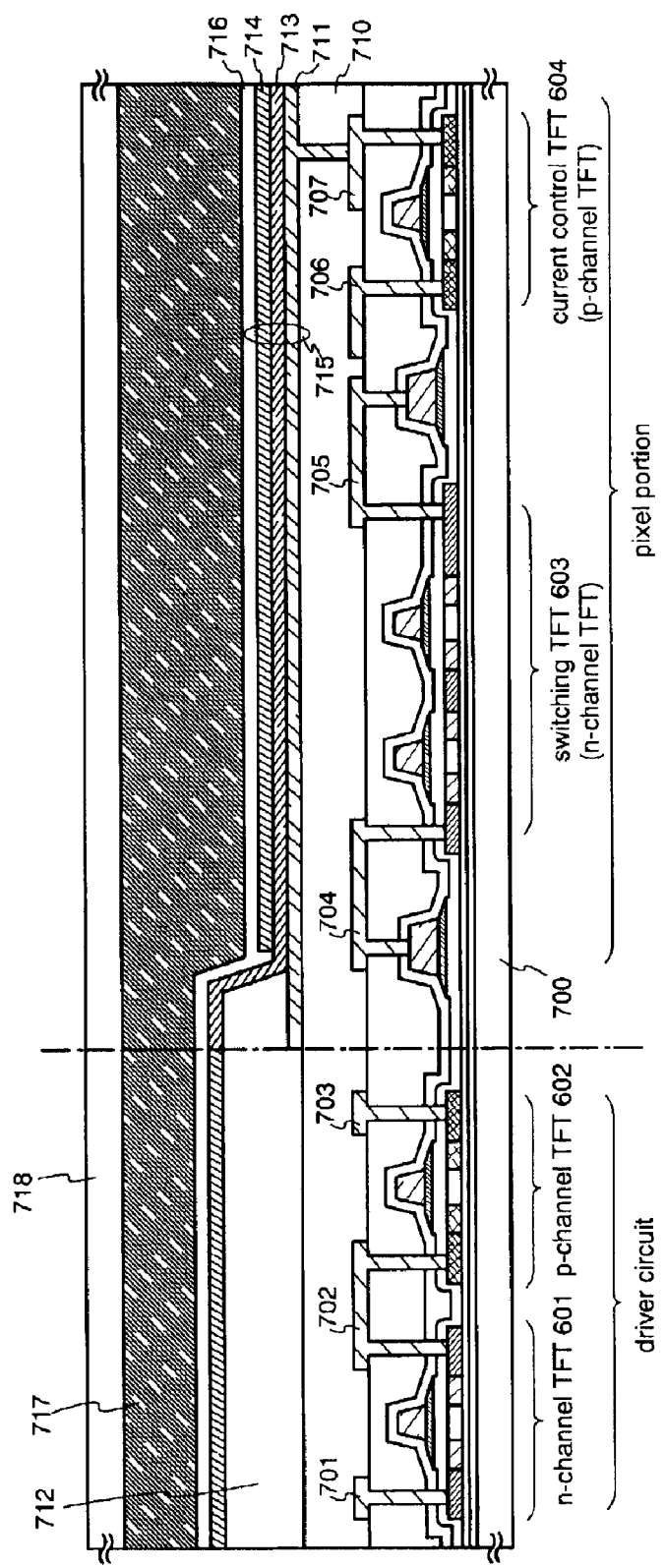
FIG. 13 is a cross-sectional configuration view of a driver circuit and a pixel portion of a light emitting device.

FIG. 13 is a sectional view of a light emitting device of this example. In FIG. 13, the switching TFT 603 provided on the substrate 700 is formed by using the n-channel TFT 503 of FIG. 10. Consequently, concerning the explanation of the structure, it is satisfactory to refer the explanation on the n-channel TFT 503.

Incidentally, although this example is of a double gate structure formed with two channel regions, it is possible to use a single gate structure formed with one channel region or a triple gate structure formed with three.

The driver circuit provided on the substrate 700 is formed by using the CMOS circuit of FIG. 10. Consequently, concerning the explanation of the structure, it is satisfactory to refer the explanation on the n-channel TFT 601 and p-channel TFT 602. Incidentally, although this example is of a single gate structure, it is possible to use a double gate structure or a triple gate structure.

Meanwhile, the wirings 701, 703 serve as source wirings of the CMOS circuit while the wiring 702 as a drain wiring. Meanwhile, a wiring 704 serves as a wiring to electrically connect between the source wiring 708 and the source region of the switching TFT while the wiring 705 serves as a wiring to electrically connect between the drain wiring 709 and the drain region of the switching TFT.

Incidentally, a current control TFT 604 is formed by using the p-channel TFT 502 of FIG. 10. Consequently, concerning the explanation of the structure, it is satisfactory to refer to the explanation on the p-channel TFT 502. Incidentally, although this example is of a single gate structure, it is possible to use a double gate structure or a triple gate structure.

Meanwhile, the wiring 706 is a source wiring of the current control TFT (corresponding to a current supply line) while the wiring 707 is an electrode to be electrically connected to the pixel electrode 711.

Meanwhile, reference numeral 711 is a pixel electrode (anode of a light-emitting element) formed by a transparent conductive film. As the transparent conductive film can be used a compound of indium oxide and tin oxide, a compound of indium oxide and zinc oxide, zinc oxide, tin oxide or indium oxide, or otherwise may be used a transparent conductive film as above added with gallium. The pixel electrode 711 is formed on a planar interlayer insulating film 710 prior to forming the wirings. In this example, it is very important to planarize the step due to the TFT by using a resin planarizing film 710. A light-emitting layer to be formed later, because being extremely small in thickness, possibly causes poor light emission due to the presence of a step. Accordingly, it is desired to provide planarization prior to forming a pixel electrode so that a light-emitting layer can be formed as planar as possible.

After forming the wirings 701 to 707, a bank 712 is formed as shown in FIG. 13. The bank 712 may be formed by patterning an insulating film or organic resin film containing silicon having 100 to 400 nm.

Incidentally, because the bank 712 is an insulating film, caution must be paid to element electrostatic breakdown during deposition. In this example added is a carbon particle or metal particle to an insulating film as a material for the bank 712, thereby reducing resistivity and suppressing occurrence of static electricity. In such a case, the addition amount of carbon or metal particle may be adjusted to provide a resistivity of $1 \times 10^6$ to $1 \times 10^{12}$ Ωm (preferably $1 \times 10^8$ to $1 \times 10^{10}$ Ωm).

A light emitting layer 713 is formed on the pixel electrode 711. Incidentally, although FIG. 13 shows only one pixel, this example separately forms the light-emitting layer correspondingly to the respective colors of R (red), G (green) and B (blue). Meanwhile, in this example is formed a low molecular weight organic light emitting material by the deposition process. Specifically, this is a lamination structure having a copper phthalocyanine (CuPc) film provided in a thickness of 20 nm as a hole injecting layer and a tris-8-qyuinolinolato aluminum complex (Alq$_3$) film provided thereon in a thickness of 70 nm as a light-emitting layer. The color of emission light can be controlled by adding a fluorescent pigment, such as quinacridone, perylene or DCM1, to Alq$_3$.

However, the foregoing example is an example of organic light emitting material to be used for a light-emitting layer and not necessarily limited to this. It is satisfactory to form a light-emitting layer (layer for light emission and carrier movement therefore) by freely combining a light-emitting layer, a charge transporting layer and an electron injecting layer. For example, although in this example was shown the example in which a low molecular weight organic light emitting material is used for a light-emitting layer, it is possible to use an intermediate organic light emitting material and a high molecular weight organic light emitting material. Furthermore, an organic light-emitting material, having no sublimation property but having molecules in the number of 20 or less or chained molecules having a length of 10 μm or less, is provided as a intermediate molecular organic light emitting material. For an example of using the high molecular weight organic light emitting material, a polythiophene (PEDOT) film with a thickness of 20 nm is formed by the spin coating method as a hole injection layer and the lamination structure installing paraphenylenvinylene (PPV) of about 100 nm on it as a light emitting layer may be good. The luminescence wave length can be selected from red to blue by using the π-conjugated type polymer of PPV. Meanwhile, it is possible to use an inorganic material such as silicon carbide for an electron transporting layer or charge injecting layer. These organic light emitting materials or inorganic materials can be a known material.

Next, a cathode 714 of a conductive film is provided on the light-emitting layer 713. In this example, as the conductive film is used an alloy film of aluminum and lithium. Of course, a known MgAg film (alloy film of magnesium and silver) may be used. As the cathode material may be used a conductive film of an element belonging to the periodic-table group 1 or 2, or a conductive film added with such an element.

A light-emitting element 715 is completed at a time having formed up to the cathode 714. Incidentally, the light-emitting element 715 herein refers to a diode formed with a pixel electrode (anode) 711, a light-emitting layer 713 and a cathode 714.

It is effective to provide a passivation film 716 in such a manner to completely cover the light-emitting element 715. The passivation film 716 is formed by an insulating film including a carbon film, a silicon nitride film or a silicon oxynitride film, and used is an insulating film in a single layer or a combined lamination.

In such a case, it is preferred to use a film favorable in coverage as a passivation film. It is effective to use a carbon film, particularly DLC (diamond-like carbon) film. The DLC film, capable of being deposited in a temperature range not more than 100° C. from room temperature, can be easily deposited over the light-emitting layer 713 low in heat resistance. Meanwhile, the DLC film, having a high blocking effect to oxygen, can suppress the light-emitting layer 713 from oxidizing. Consequently, the problem of oxidation can be prevented in the light-emitting layer 713 during the following sealing process.

Furthermore, a sealing member 717 is provided on the passivation film 716 so as to bond a cover member 718. For the sealing member 717 used may be an ultraviolet curable resin. It is effective to provide therein a substance having a hygroscopic effect or an antioxidant effect. Meanwhile, in this example, for the cover member 718 used is a glass substrate, quartz substrate or plastic substrate (including a plastic film) having carbon films (preferably diamond-like carbon films) formed on the both surfaces thereof. In addition to the carbon film, the aluminum film (such as AlON, AlN, and AlO), SiN and the like are used.

Thus, completed is a light emitting device having a structure as shown in FIG. 13. Incidentally, it is effective to continuously carry out, without release to the air, the process to form a passivation film 716 after forming a bank 712 by using a deposition apparatus of a multi-chamber scheme (or in-line scheme). In addition, with further development it is possible to continuously carry out the process up to bonding a cover member 718, without release to the air.

In this manner, n-channel TFT 601 and p-channel TFT 602, a switching TFT (n-channel TFT) 603 and a current control TFT (p-channel TFT) 604 are formed on the substrate 700.

Furthermore, as was explained using FIG. 13, by providing an impurity region overlapped with the gate electrode through an insulating film, it is possible to form an n-channel TFT resistive to the deterioration resulting from hot-carrier effect. Consequently, a light emitting device with high reliability can be realized.

Meanwhile, this example shows only the configuration of the pixel portion and driver circuit. However, according to the manufacturing process in this example, besides these, it is possible to form on the same insulating member such logic circuits as a signal division circuit, a D/A converter, an operation amplifier, a γ-correction circuit or the like. Furthermore, a memory or microprocessor can be formed.

The light emitting device formed by the above-mentioned method has TFT formed by using the semiconductor film thoroughly annealed, because it is irradiated the laser beam that has a very excellent uniform energy distribution. Therefore, the above-mentioned light emitting device is obtained enough operation characteristic and reliability. Such a light emitting device can be used as display portions of various electronic equipments.

Incidentally, this example can be freely combined with first embodiment to fifth embodiment.

[Embodiment 4]

Various semiconductor devices (active matrix type liquid crystal display device, active matrix type light emitting device or active matrix type EC display device) can be formed by applying the present invention. Specifically, the present invention can be embodied in electronic equipment of any type in which such an electro-optical device is incorporated in a display portion.

Such electronic equipment is a video camera, a digital camera, a projector, a head-mounted display (goggle type display), a car navigation system, a car stereo, a personal computer, a mobile information terminal (such as a mobile computer, a mobile telephone or an electronic book etc.) or the like. FIGS. 14A to 14F, 15A to 15D, and 16A to 16C show one of its examples.

FIG. 14A shows a personal computer which includes a main body 3001, an image input portion 3002, a display portion 3003, a keyboard 3004 and the like. A semiconductor device manufactured according to the present invention is applied to the display portion 3003 to complete the personal computer of the present invention.

FIG. 14B shows a video camera which includes a main body 3101, a display portion 3102, a sound input portion 3103, operating switches 3104, a battery 3105, an image receiving portion 3106 and the like. A semiconductor device manufactured according to the present invention is applied to the display portion 3102 to complete the video camera of the present invention.

FIG. 14C shows a mobile computer which includes a main body 3201, a camera portion 3202, an image receiving portion 3203, an operating switch 3204, a display portion 3205 and the like. A semiconductor device manufactured according to the present invention is applied to the display portion 3205 to complete the mobile computer of the present invention.

FIG. 14D shows a goggle type display which includes a main body 3301, a display portion 3302, arm portions 3303 and the like. The display portion 3302 is bent to manufacture a goggle type display by using a fixable substrate. A lightweight and thin goggle type display is realized. A semiconductor device manufactured according to the present invention is applied to the display portion 3302 to complete the goggle type display of the present invention.

FIG. 14E shows a player using a recording medium on which a program is recorded (hereinafter referred to as the recording medium), and the player includes a main body 3401, a display portion 3402, speaker portions 3403, a recording medium 3404, operating switches 3405 and the like. This player uses a DVD (Digital Versatile Disc), a CD and the like as the recording medium, and enables a user to enjoy music, movies, games and the Internet. A semiconductor device manufactured according to the present invention is applied to applying to the display portion 3402 to complete the recording medium of the present invention.

FIG. 14F shows a digital camera which includes a body 3501, a display portion 3502, an eyepiece portion 3503, operating switches 3504, an image receiving portion (not shown) and the like. A semiconductor device manufactured according to the present invention is applied the display portion 3502 to complete the digital camera of the present invention.

Figure 15A:
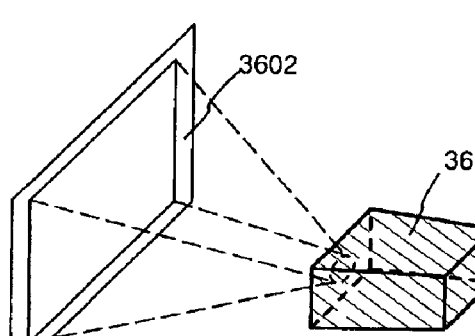
FIGS. 15A to 15D show examples of a semiconductor device.

FIG. 15A shows a front type projector which includes a projection device 3601, a screen 3602 and the like. A semiconductor device manufactured according to the present invention is applied to the liquid crystal display device 3808 that constitutes a part of the projection device 3601 and other driver circuits to complete the front type projector of the present invention.

Figure 15B:
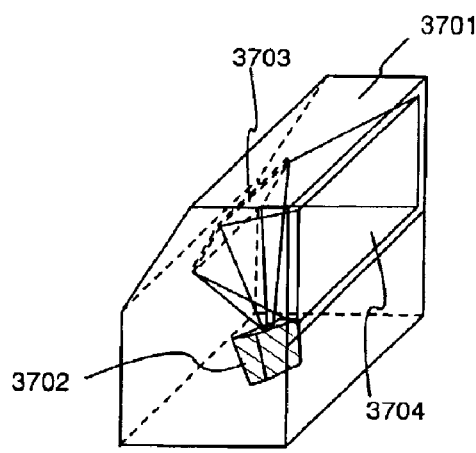

FIG. 15B shows a rear type projector which includes a main body 3701, a projection device 3702, a mirror 3703, a screen 3704 and the like. A semiconductor device manufactured according to the present invention is applied to the liquid crystal display device 3808 that constitutes a part of the projection device 3702 and other driver circuits to complete the rear type projector of the present invention.

Figure 15C:
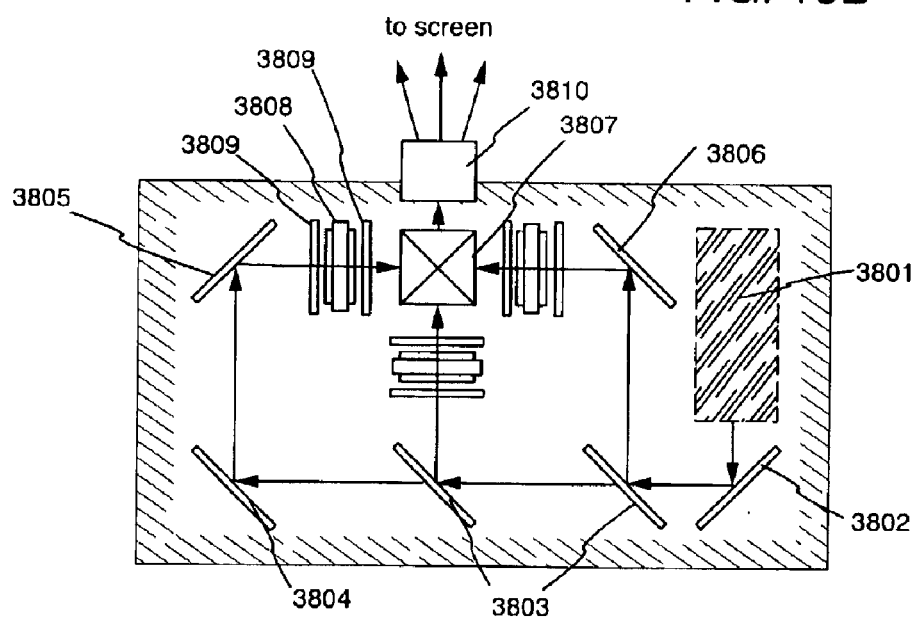

FIG. 15C shows one example of the structure of each of the projection devices 3601 and 3702 which are respectively shown in FIGS. 15A and 15B. Each of the projection devices 3601 and 3702 is made of a light source optical system 3801, mirrors 3802 and 3804 to 3806, a dichroic mirror 3803, a prism 3807, a liquid crystal display device 3808, a phase difference plate 3809 and a projection optical system 3810. The projection optical system 3810 is made of an optical system including a projection lens. Present example is an example of a three-plate type, but it is not limited to this example and may also be of a single-plate type. In addition, those who embody the invention may appropriately dispose an optical system such as an optical lens, a film having a polarization function, a film for adjusting phase difference, an IR film or the like in the path indicated by arrows in FIG. 15C.

Figure 15D:
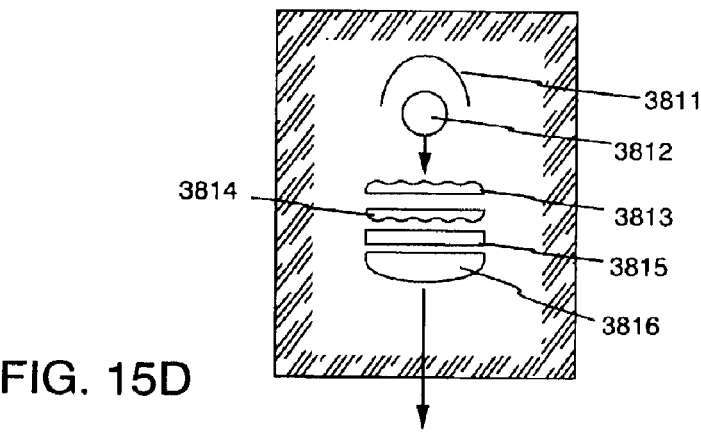

FIG. 15D is a view showing one example of the structure of the light source optical system 3801 shown in FIG. 15C.

In this example, the light source optical system 3801 is made of a reflector 3811, a light source 3812, lens arrays 3813 and 3814, a polarizing conversion element 3815 and a condenser lens 3816. Incidentally, the light source optical system shown in FIG. 15D is one example, and the invention is not particularly limited to the shown construction. For example, those whose embody the invention may appropriately dispose an optical system such as an optical lens, a film having a polarization function, a film for adjusting phase difference, an IR film or the like.

The projector shown in FIGS. 15A to 15D is of the type using a transparent type of electro-optical device, but there is not shown an example in which the invention is applied to a reflection type of electro-optical device and a light emitting device.

FIG. 16A shows a mobile telephone which includes a main body 3901, a sound output portion 3902, a sound input portion 3903, a display portion 3904, operating switches 3905, an antenna 3906 and the like. A semiconductor device manufactured according to the present invention is applied to the display portion 3904 to complete the mobile telephone of the present invention.

FIG. 16B shows a mobile book (electronic book) which includes a main body 4001, display portions 4002 and 4003, a storage medium 4004, operating switches 4005, an antenna 4006 and the like. A semiconductor device manufactured according to the present invention is applied to the display portions 4002 and 4003 to complete the mobile book of the present invention. The mobile book can be made in a size identical to a pocket book, therefore, it is ultra-portable.

FIG. 16C shows a display which includes a main body 4101, a support base 4102, a display portion 4103 and the like. Since the display portion 4103 is manufactured by using a fixable substrate, a lightweight, thin display can be realized. Further, the display portion 4103 can be bent. A semiconductor device manufactured by the present invention is applied to the display portion 4103 to complete the display of the present invention. The invention is particularly advantageous to a large-screen display, and is advantageous to a display having a diagonal size of 10 inches or more (particularly, 30 inches or more).

As is apparent from the foregoing description, the range of applications of the invention is extremely wide, and the invention can be applied to any category of electronic apparatus. Electronic apparatus according to the invention can be realized by using a construction made of a combination of arbitrary ones of first embodiment to fifth embodiment and first example to second example, or third example.

As described above, using the laser irradiation apparatus of the present invention improves the homogeneity in the energy density of a laser beam formed on an irradiation surface.

In addition, while a lens for transmitting laser beams is repeatedly used, the lens gradually deteriorates; however, dissimilar to such a lens, a mirror as used in the present invention does not transmit laser beams while reflecting the laser beams impinged against its surface. That is, only the surface of the mirror is deteriorated. Thus, even in a case where a mirror is used for a long time, the mirror can be rectified to be usable by recoating the mirror surface. From this viewpoint, the mirror is economically advantageous. Further, since a parabolic mirror as used in the present invention does not cause spherical aberration, the mirror is effective when used as an optical system. Further, using a mirror of the type movable with a micrometer or the like enables fine adjustment.

Further to the above-described advantages, laser beam irradiation can be efficiently implemented according to the laser irradiation method and the laser irradiation apparatus carrying out the method. Furthermore, in a semiconductor device represented by an active-matrix liquid crystal display device, operational characteristics as well as reliability can be improved. Still furthermore, a cost reduction in the manufacture of semiconductor devices can be implemented.

What is claimed is:

1. A laser irradiation method comprising:
    splitting a laser beam into a plurality of laser beams by using a plurality of mirrors each having a concave surface; and
    irradiating the plurality of laser beams to an irradiation surface,
    wherein the plurality of mirrors are separated into two mirror groups, wherein:
        a first mirror group converges laser beams between the irradiation surface and the plurality of mirrors; and
        a second mirror group converges laser beams on an opposite side of the plurality of mirrors with respect to the irradiation surface.

2. A laser irradiation method according to claim 1, wherein laser beams reflected by the plurality of mirrors are overlapped on the irradiation surface.

3. A laser irradiation method according to claim 1, wherein the sum of amounts of energies of laser beams that are received by the first mirror group is the same as the sum of amounts of energies of laser beams that are received by the second mirror group.

4. A method for manufacturing a semiconductor device comprising:
    forming an amorphous semiconductor film over a substrate having an insulation surface; and
    crystallizing the amorphous semiconductor film by irradiating a laser beam overlapped on an irradiation surface;
    emitting a laser beam from a laser;
    splitting the laser beam into a plurality of laser beams by using a plurality of mirrors each having a concave surface, wherein the plurality of mirrors are separated into two mirror groups having different focal positions with each other; and
    irradiating the amorphous semiconductor film with the plurality of laser beams overlapped on an irradiation surface.

5. A method for manufacturing a semiconductor device according to claim 4, wherein the two mirror groups having different focal positions comprising:
    a first mirror group having the focal position existing between the amorphous semiconductor film and the plurality of mirrors; and
    a second mirror group having the focal position existing on an opposite side of the plurality of mirrors with respect to the amorphous semiconductor film.

6. A method for manufacturing a semiconductor device according to claim 4, wherein the sum of amounts of energies of laser beams that are received by the first mirror group is the same as the sum of amounts of energies of laser beams that are received by the second mirror group.

7. A method for manufacturing a semiconductor device according to claim 4, wherein the semiconductor device is at least one selected from the group consisting of a personal computer, a video camera, a mobile computer, a goggle-type display, a player using a recording medium, a digital camera, a projector, a mobile telephone, and an electronic book.

8. A laser irradiation method comprising:

splitting a laser beam into a plurality of laser beams by using a plurality of mirrors; and irradiating the plurality of laser beams to an irradiation surface, wherein the plurality of mirrors are separated into two mirror groups, wherein:
- a first mirror group converges laser beams between the irradiation surface and the plurality of mirrors; and
- a second mirror group converges laser beams on an opposite side of the plurality of mirrors with respect to the irradiation surface.

9. A laser irradiation method according to claim 8, wherein laser beams reflected by the plurality of mirrors are overlapped on the irradiation surface.

10. A laser irradiation method according to claim 8, wherein the sum of amounts of energies of laser beams that are received by the first mirror group is the same as the sum of amounts of energies of laser beams that are received by the second mirror group.

11. A method for manufacturing a semiconductor device comprising:

forming an amorphous semiconductor film over a substrate having an insulation surface; and emitting a laser beam from a laser;

splitting the laser beam into a plurality of laser beams by using a plurality of mirrors, wherein the plurality of mirrors are separated into two mirror groups having different focal positions with each other; and irradiating the amorphous semiconductor film with the plurality of laser beams.

12. A method for manufacturing a semiconductor device according to claim 11, wherein the two mirror groups having different focal positions comprising:
- a first mirror group having the focal position existing between the amorphous semiconductor film and the plurality of mirrors; and
- a second mirror group having the focal position existing on an opposite side of the plurality of mirrors with respect to the amorphous semiconductor film.

13. A method for manufacturing a semiconductor device according to claim 11, wherein the sum of amounts of energies of laser beams that are received by the first mirror group is the same as the sum of amounts of energies of laser beams that are received by the second mirror group.

14. A method for manufacturing a semiconductor device according to claim 11, wherein the semiconductor device is at least one selected from the group consisting of a personal computer, a video camera, a mobile computer, a goggle-type display, a player using a recording medium, a digital camera, a projector, a mobile telephone, and an electronic book.

* * * * *